June 20, 1961  J. L. BARKER  2,989,728
TRAFFIC AND OTHER CONTROL SYSTEMS
Filed May 25, 1955  5 Sheets-Sheet 1

INVENTOR
John L. Barker
BY
Edward H. Cairns
ATTORNEY

June 20, 1961   J. L. BARKER   2,989,728
TRAFFIC AND OTHER CONTROL SYSTEMS
Filed May 25, 1955   5 Sheets-Sheet 2
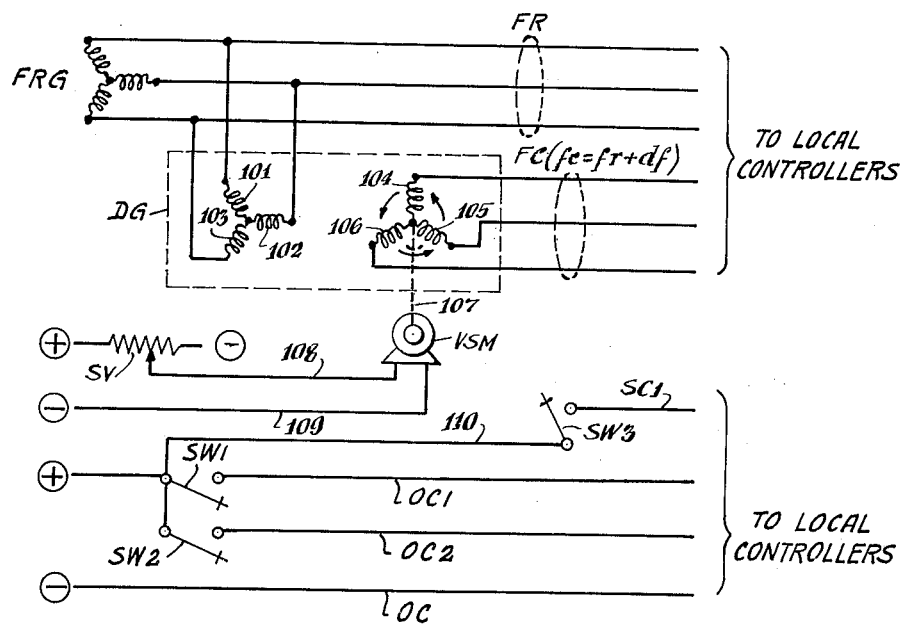
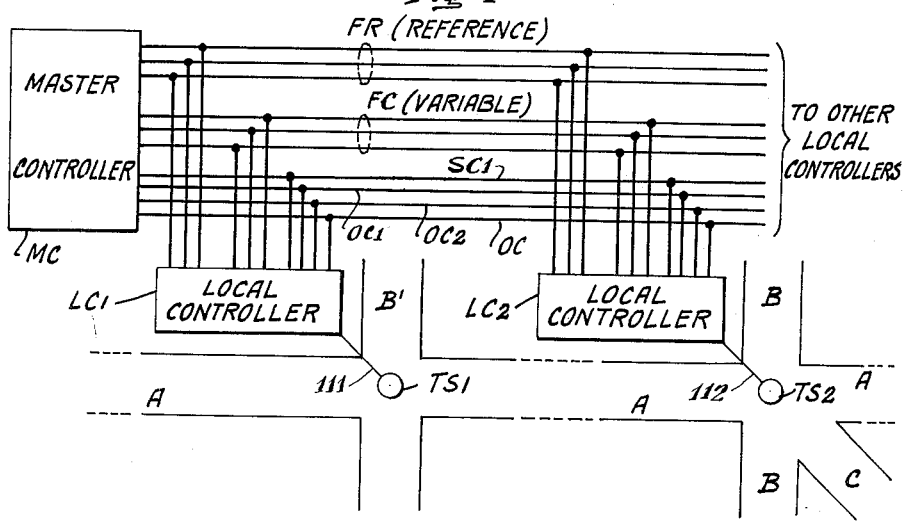
INVENTOR
John L. Barker
BY
Edward H. Eames
ATTORNEY

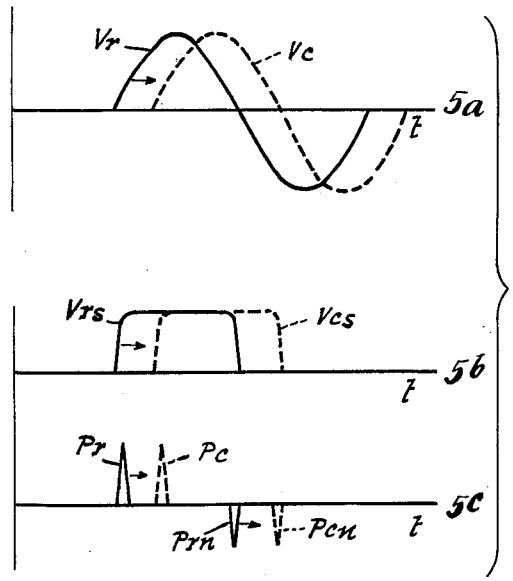
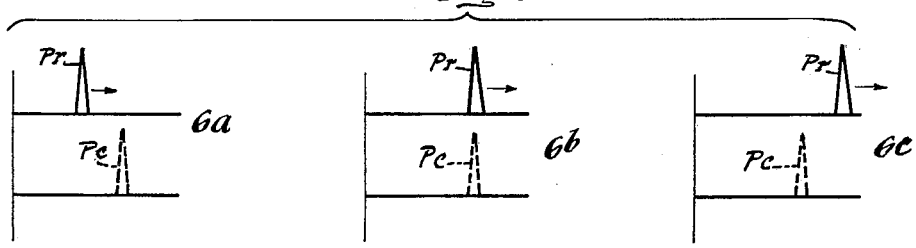
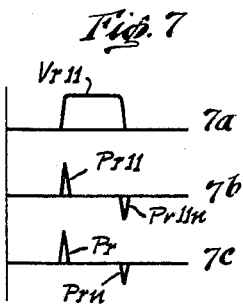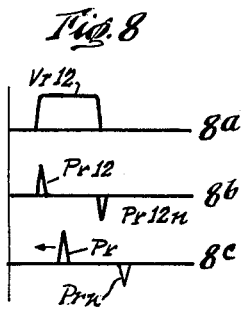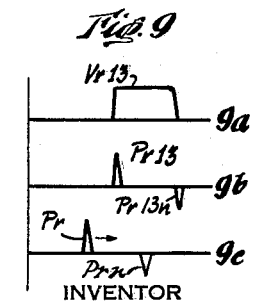
INVENTOR
John L. Barker
BY
Edward H. Eames
ATTORNEY June 20, 1961

J. L. BARKER 2,989,728

TRAFFIC AND OTHER CONTROL SYSTEMS

Filed May 25, 1955

INVENTOR
John L. Barker
BY
Edward H. Cairns
ATTORNEY

Fig. 11

United States Patent Office 2,989,728
Patented June 20, 1961

2,989,728
TRAFFIC AND OTHER CONTROL SYSTEMS
John L. Barker, Norwalk, Conn., assignor, by mesne assignments, to Laboratory for Electronics, Inc., Boston, Mass., a corporation of Delaware
Filed May 25, 1955, Ser. No. 510,926
46 Claims. (Cl. 340—40)

This invention relates to a control system for remote control of operations in desired cyclic time relation as in centrally controlled supervisory systems, and in one aspect particularly relates to traffic control systems having a central master controller for operating in various desired cyclic relations a number of local intersection traffic signal controllers along one or more streets or throughout a network or grid of streets for example, although apparatus employing the features of the invention may also be applied to remote control of chemical or other manufacturing process cycles or of a sequence of operations at one or more locations.

The invention more particularly relates to a control system or traffic control system in which individual local controllers may have individually adjusted distribution of their time cycles or "split" of signal periods, or several such individual "splits" with selection among such splits by remote control from the master controller, and with the total time cycles of the several local controllers determined and shortened or lengthened together by remote control from the master, while maintaining substantially the same percentage split of the cycle if desired for example. The invention also is adapted readily to the remote control of the offsets of the time cycles of the several signal controllers, and relates to a greatly improved method and means of changing offsets.

Among its more general aspects, the invention relates to improved means and methods of employing phase comparison of two electrical wave energies, one of which is gradually and progressively shifting in phase relation to the other at a desired time rate, to derive a time cycle between phase coincidences of the two wave energies, and to derive one or more further wave energies in selected constant phase displaced relation to one of the first two wave energies to provide a control for signalling or other operation at corresponding selected percentage or phase position points in a time cycle in remote control or self-synchronized systems.

Several individually adjustable devices may be employed at one location or several different locations to derive desired phase displaced wave energies having different selected constant phase displacement with respect to one of the first wave energies with coincidence circuit arrangements to provide an output pulse at the cyclic phase coincidence of the phase displaced wave energy and the other of the original or first mentioned wave energies which is progressively shifting phase with relation to it.

Several coincidence response channels may be provided individual to several differently phase displaced devices, or one channel at one location may be employed in connection with a multi-position cyclic switch to associate it with several differently displaced devices at that location, to derive pulse outputs at several spaced points throughout the time cycle.

Furthermore, some features of such a phase comparison system may be employed to have one or more remotely controlled elements rotate to a desired phase coincidence or desired coincidence of phase displacement with respect to a particular wave energy as a reference, and thus into a particular angular positional relationship, for example. A local element may be automatically rotated from one remotely selected and locally adjusted phase displaced relation to another such relation in response to change between such remote selections, for example, according to a further feature of the invention.

Thus among other features the present invention sets forth novel means and methods of deriving output pulses and control operations at various selected points in predetermined percentage or phase relation to a remotely controlled time cycle through determining the phase coincidence of two wave energies, one of which is very slowly shifting phase with respect to the other to provide a time cycle between such coincidences, and to derive one or more locally phase displaced wave energies with respect to one of the original wave energies, and to employ coincidence of such one or more locally phase displaced wave energies with the other of the original wave energies or with another locally phase displaced wave energy derived from the latter to provide an output at one or more locally desired phase angles or percentage points in the time cycle. Such percentage points may be individually locally adjusted and remotely selected if desired. Phase coincidence may also be employed to shift gradually one phase displaced wave energy from phase correspondence with one to phase correspondence with another of two selected phase displaced wave energies all derived from the same periodic wave energy source.

Furthermore, the present invention in certain aspects applies such phase comparison features to a traffic control system, where the invention has particular value in coordinating the operation of traffic signal controllers at a number of remotely located intersections from a central control point while providing for a high degree of flexibility in setting the distribution of the time cycle among the various signal periods of the individual controllers, and setting the offset relation of the respective time cycles of the several individual controllers, enabling several coordinated signal patterns to be employed.

My prior U.S. Patent 2,542,978 discloses one form of master controlled offset selection and variable cycle length system for a number of local traffic signal controllers, for example.

According to one aspect of the present invention, a multiphase constant reference frequency and a multiphase variable frequency are both generated at the master controller, with the variable frequency derived from but having continuous gradual phase shift with respect to the reference frequency at an adjustable time rate, the time required for the variable frequency to shift one cycle with respect to the reference frequncy corrsponding to the desired total traffic signal time cycle for example, the "variable frequency" being variable in the sense that it is adjustable to the desired value of difference from the reference frequency for a desired signal cycle length but is constant at such adjusted value for such particular signal length.

The variable and reference frequencies are transmitted from the master controller to the several local controllers and at the latter these frequencies are applied to the stators of individual 360 degree potentiometers, one poteniometer on each multiphase frequency circuit for example, and rotor arms providing adjustable position taps at 180 degree spacing on such potentiometers take off voltages providing two sine wave outputs, one of which shifts its time phase with respect to the other slowly and uniformly at the desired rate of phase shift of the master controller.

These two sine wave voltages, each of single phase, one derived from the reference frequency and the other from the variable frequency, are applied to pulse forming circuits to derive a sharp narrow pulse at corresponding points on their respective sine waves, such as at zero on the up-slope of the wave, for example, and the two pulses (one gradually and progressively shifting in time phase with respect to the other) are applied to a coincidence gate circuit to derive an output once per signal cycle at a particular point in the cycle as determined by the position of the potentiometer rotors. This coincidence pulse is then employed to operate a relay or other device to operate a particular signal or to switch signals in a signal cycle, or may perform other desired operations or control functions in desired cyclic time relations.

In a preferred embodiment of the invention the coincidence of the pulses is employed to advance a cyclic stepping switch one step in a cycle of traffic signal indications, the stepping switch connecting other response point potentiometers into the pulse forming and coincidence gate circuit at desired points in its step-by-step cycle to control the signal switching or transfer points and consequently "split" or distribution of the signal cycle in accordance with the setting of the respective potentiometers.

According to a further aspect of the invention, by remote control of local relay circuits one of several potentiometers associated with the reference frequency may be selected to provide a desired offset or phase relation of the signal cycles, or remote selection between sets of variable frequency potentiometers may be made to select different splits.

According to another aspect of the invention a modified coincidence gate and phase polarity sensing gate may be applied to a bi-directional motor to rotate the rotor of a local reference potentiometer into coincidence with a desired or remote selected reference frequency potentiometer to slowly and smoothly adjust from one offset relation to another in the nearest direction of retarding or accelerating the cyclic operation of the individual local controllers over a period of a fraction of a signal cycle to several signal cycles for example, depending on the degree of change required between offsets.

The invention is described particularly from its preferred aspects of providing both multi-phase reference frequency and multiphase variable frequency, and is illustrated in one preferred form in which both the reference frequency and the variable frequency are three phase, in order to provide the maximum of flexibility in deriving adjustable phase displaced voltages from one of these two frequencies to establish desired response points throughout the time cycle, and in deriving adjustable phase displaced voltages with respect to the other of the two frequencies to enable a desired phase displacement, or offset relationship in the case of traffic signal controllers, to be obtained for the entire time cycle. However, it will be understood that if these local controllers need not have an adjustable phase displaced relationship, as for example, if all of the time cycles are to be on a synchronized basis, with the local time cycles to have no phase displacement or offset with relation to the reference frequency, then such reference frequency need only be single phase rather than multiphase.

Thus in a simple case for example if the master controller is to operate one local controller at several locally adjusted points in the time cycle but without local adjustment of the offset or phase relation of the entire time cycle to the reference frequency, then such a system employing a master controller and one local controller may have a single phase reference frequency which may be applied directly to the peak pulse forming circuits leading to the coincidence gate, without any intervening phase adjusting potentiometer, whereas the variable or control frequency would preferably be three phase with 360 degree potentiometers for the one or more response points desired which are to have adjustable phase displaced relationship, the single phase output of the diametral rotors of the latter potentiometers thus being applied to the other pulse forming network to be compared in the same coincidence gate with the single phase reference frequency mentioned above.

Similarly, several local controllers may have a single phase reference frequency if no adjustment of local phase displacement is desired.

It is an object of the invention to provide an improved traffic control system of the master-local type in which a number of local or intersection traffic signal controllers have a common time cycle determined by the master controller with individual local adjustment of the various signal periods in relation to such time cycle and with individual local adjustment of the offset of the time cycle.

It is also an object of the invention to provide an improved traffic control system in which a number of local traffic signal controllers have a common total time cycle controlled from a master controller, with individual adjustment of the several signal periods of the time cycle and with the distribution and length of the several signal periods in the time cycle determined in part at the local controllers and in part at the master controller.

It is another object of the invention to provide a traffic control system in which a number of local traffic signal controllers have their signal time cycles controlled from the master controller with selection by the master controller between or among individually adjusted offsets at the local controller, with the time cycle of the local controller shifted smoothly and slowly in the nearest direction to the new offset relation upon each change of selection by the master controller.

It is another object of the invention to provide an improved traffic control system of the master-local type, with master controlled selection between locally adjusted offsets and with the local signal time cycle shifted smoothly and slowly in the nearest direction from the previously selected offset to the newly selected offset relation.

It is a further object of the invention to provide an improved traffic control system in which a signal change in a local controller is controlled by phase coincidence between two periodic wave energies supplied from a remote master controller, one such wave energy being shifted progressively in phase relation to the other It is also an object of the invention to provide a traffic control system in which the time cycle of a local traffic signal controller has a plurality of individually adjustable phase displaced offset relations to a reference periodic wave energy supplied by a remote master controller in which a local offset determining unit for the traffic signal cycle rotates in the nearest direction from the old offset to the new offset relation upon each change from an old offset to a new offset by selection by the master controller.

It is also an object of the invention to provide in a master control system having two periodic wave energies, one of which progressively shifts in phase with relation to the other at a slow controlled rate, a traffic signal controller providing a signal change in response to coincidence of a voltage having a predetermined phase relation to one of said wave energies and a voltage having a predetermined phase relation to the other of said wave energies.

It is another object of the invention to provide a remote control system in which one or more output pulses are derived at a predetermined one or more phase displacements with respect to one of two remotely supplied periodic wave energies which are shifting slowly in phase relative to each other to provide a relatively prolonged time cycle between successive phase coincidences of such two wave energies.

Other objects of the inventions will appear from the accompanying claims and from the following description of the invention with respect to the drawings in which:

FIG. 3 illustrates in somewhat more detailed schematic form a master controller for a control system according to one embodiment of the invention.

FIG 4 illustrates in block diagram form two of a series of intersections along a highway with individual traffic signals and local controllers and connections with the master controller of FIG. 3 for example.

Figure 1:
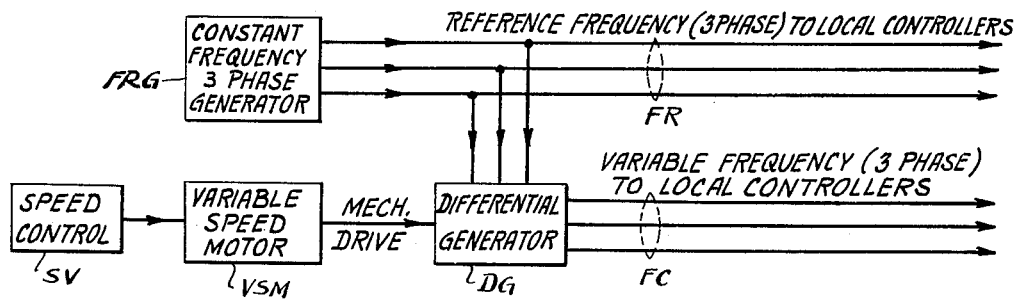
FIG. 1 illustrates in block diagram form a master controller with connections for a control system or traffic control system according to one embodiment of the invention.

FIG. 5, including SUBFIGURES 5a, 5b and 5c, illustrates sine wave forms and successive stages of pulse forms derived from the reference frequency and the control frequency in connection with spike pulse forming networks according to one embodiment of the invention.

FIG. 6, including SUBFIGURES 6a, 6b and 6c, illustrates successive time positions of the spike pulses derived from the reference and control frequencies in approaching and passing coincidence in the time cycle.

Figure 11:
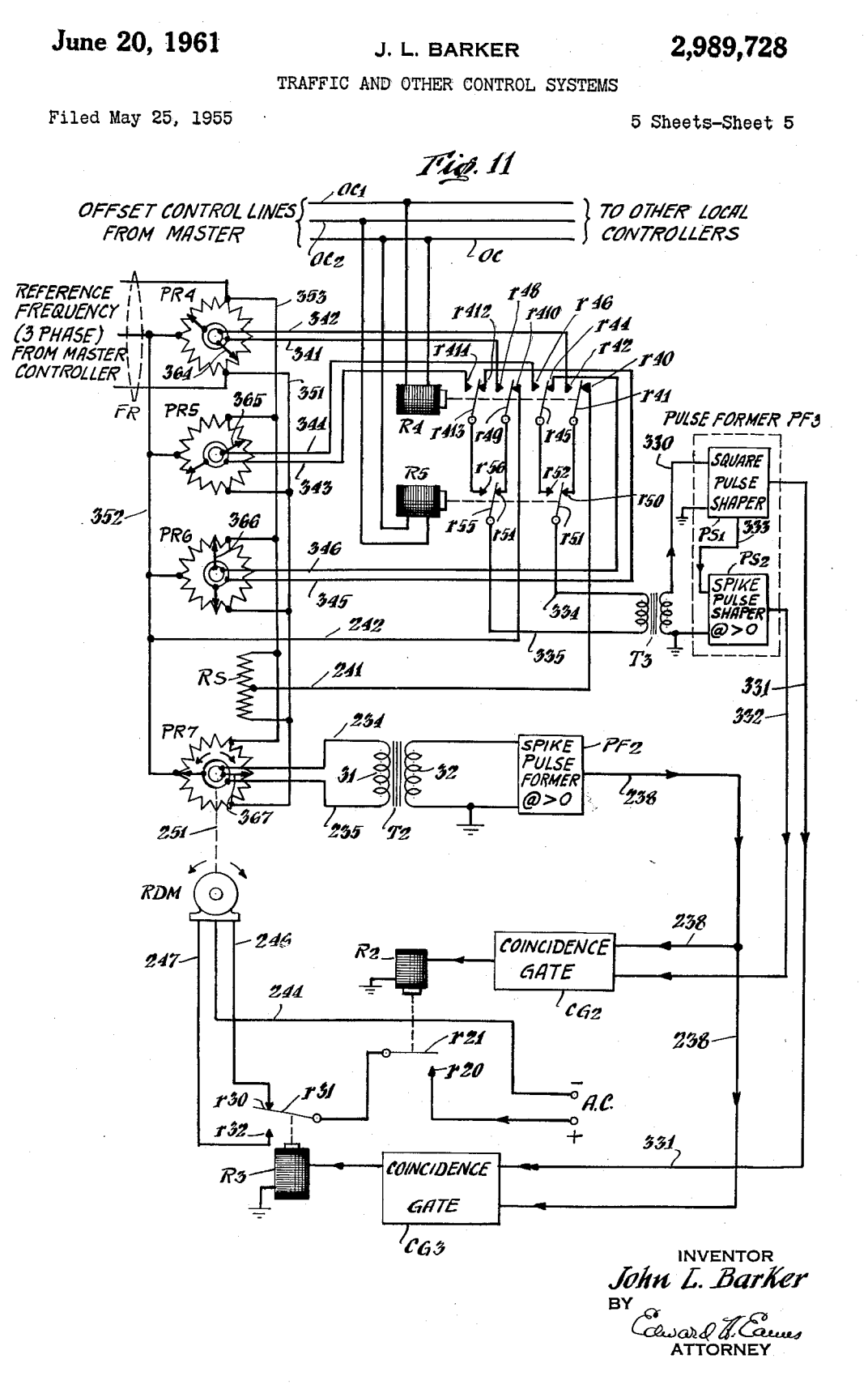

FIG. 7, including SUBFIGURES 7a, 7b and 7c, illustrates the pulse forms at coincidence in the selective phase offset homing feature of the invention of FIG. 11 and illustrated in more detailed circuit form in FIG. 10.

FIG. 8, including SUBFIGURES 8a, 8b and 8c, illustrates the same pulse forms as in FIG. 7 but in different time phase relationship, approaching coincidence in one phase direction.

FIG. 9, including SUBFIGURES 9a, 9b and 9c, illustrates the same pulse forms as in FIG. 7 and in FIG. 8 but in different time phase relation indicating approach to coincidence in a phase direction opposite to FIG. 8.

FIG. 10 illustrates in detailed schematic circuit form a preferred embodiment of a local controller with connections for cooperation with the master controller of FIG. 3 for example and employing several aspects of the invention.

FIG. 11 illustrates in partly block diagram and partly schematic form the selective phase offset homing feature of the invention which may be employed for one or more local controllers in a remote control system with connections to a master controller as in FIG. 3 for example.

In considering the more detailed description below of the invention in relation to the several figures of the drawings it will be understood that in the timing of any given length of the time cycle, for traffic signal operation or for other purposes, in accordance with the invention, it is the period between successive phase coincidences of the two wave energies derived from the master controller which is the important timing factor, and consequently the time rate of phase shift of one of these wave energies with respect to the other determines the time cycle as controlled by the master controller. For any given time cycle length this rate of phase shift is constant, or in other words there is a constant frequency difference between the two frequencies of the respective two basic wave energies transmitted from the master controller to the local controllers supervised by the master controller.

If it is desired to change to a longer time cycle for the local controllers, then the frequency difference between the basic wave energies is decreased so that the rate of phase shift of one wave energy with respect to the other is decreased and the period between phase coincidences is thereby increased, to increase the length of the controlled time cycle.

Although such reduction of the frequency difference might be accomplished by increasing the frequency of the lower of the two frequencies and reducing the frequency of the upper of the two frequencies for example, it will be obvious that it is more convenient to keep one of the frequencies constant as a reference and to change only the other frequency, which thus may be considered a variable frequency or control frequency, both the reference frequency and the control frequency being constant for any given time cycle length, but the control frequency being adjustable over a range of desired values in obtaining an adjustable time rate of phase shift between the two frequencies and thus an adjustable time period between phase coincidences and corresponding controlled time cycle length.

Thus for convenience of reference and describing the invention one of the frequencies is assumed to be constant and is referred to as the reference frequency or reference periodic wave energy and the other adjustable frequency is referred to as the variable or control frequency or control wave energy, without intending that the invention shall be limited thereby.

For purposes of illustration and without limiting the invention thereto, the following values may be employed for the two basic periodic wave energies transmitted from the master controller to the local controllers. The reference frequency may be 400 cycles per second and the variable or control frequency may be adjustable from $400+\frac{1}{40}$ cycles per second to $400+\frac{1}{120}$ cycles per second for a controlled time cycle adjustable between 40 seconds and 120 seconds in length, of the order of those widely used in traffic signals for street and road intersections, for example; and for a controlled time cycle of 60 seconds, the reference frequency may be 400 cycles per second and the control frequency $400+\frac{1}{60}$ cycles per second or 400.0167 cycles per second approximately, for example.

It will be understood in this connection that the control frequency may be varied between desired difference frequency limits at similar values below the reference frequency if desired instead of above the reference frequency as illustrated in the above example, if it is desired to have the progressive phase shift between the two frequencies in the opposite direction. In the first instance with the reference frequency lower the reference frequency will progessively lag further behind the control frequency between phase coincidences on a time scale, and in the second instance with the reference frequency higher than the control frequency the control frequency will lag progressively further behind the reference frequency between coincidences on a time scale, and either method may be used within the scope of the invention.

Since the progressive phase shift between the reference frequency and the control frequency is relative, where both reference frequency and control frequency are on the same time scale either one may be considered constant in position and the other moving, and thus the lagging shift of one frequency toward the right is the equivalent of the leading shift of the other frequency toward the left. Thus the control frequency may be considered as shifting progressively to the right with the reference frequency stationary on the time scale, or the reference frequency may be considered as shifting progressively to the left with the control frequency stationary on the time scale.

For convenience of illustration the preferred form of the invention is described primarily from the viewpoint that the control frequency is higher than the reference frequency and consequently the reference frequency has a progressive lagging phase shift, or in other words a given point on the reference frequency wave travels slowly to the right with respect to a corresponding point on the control frequency wave, on a left to right time scale.

Referring now to FIG. 1, relating to the master controller in more detail, the block FRG at the upper left represents a three phase alternating current generator supplying the constant reference frequency according to a preferred form of the invention. The three lines extending from this generator FRG toward the right, and designated FR as a group, transmit this three phase reference frequency to the several local controllers.

From these three reference frequency lines FR, a group of three branch lines extend downward to supply this three phase reference frequency to the input of a differential generator in block DG. This differential generator is illustrated in more detail in one preferred form in FIG. 3, but essentially adds or subtracts a small difference frequency to or from the reference frequency as desired to provide a new three phase frequency output differing so slightly from the reference frequency that the difference frequency amounts to a very slow progressive phase shift.

The differential generator DG is operated by a mechanical drive from variable speed motor VSM under control of the speed control SV, to vary the rate of progressive phase shift of the wave energy on lines FC with respect to the reference wave energy on lines FR and thus to vary the time cycle between successive phase coincidences of the two wave energies.

By making the variable frequency of lines FC from the reference frequency of lines FR by means of the differential generator, the reference frequency may drift in absolute frequency without upsetting the phase relationship of the variable frequency to the reference frequency, since the difference frequency remains the same as the differential generator is a phase shifter only.

Figure 2:
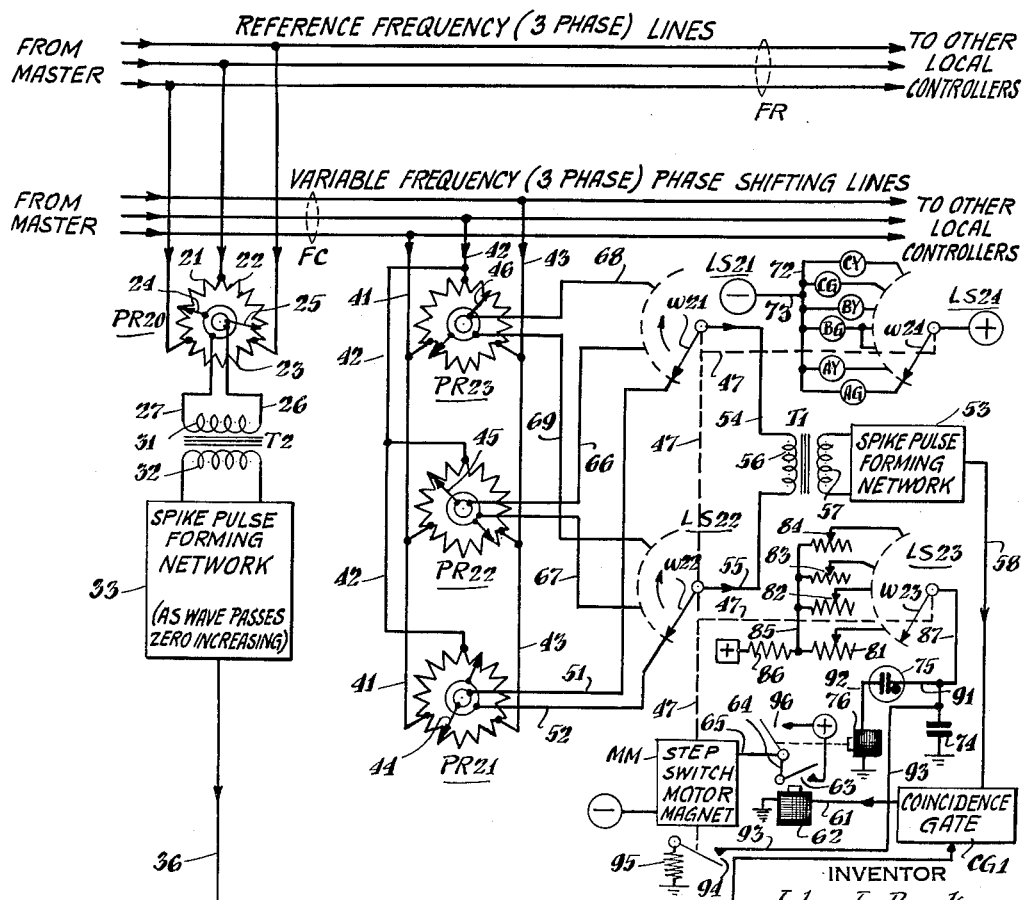
FIG. 2 illustrates partly in block diagram and partly in schematic form a local controller or traffic signal controller, with connections to the master controller and extending to other local controllers, for cooperation with the master controller of FIG. 1 for example, according to one embodiment of the invention.

FIG. 2 illustrates one form of local controller associated with the reference frequency lines and variable frequency lines extending from the master controller of FIG. 1 to the several local controllers. The reference frequency lines FR starting at the left of FIG. 2 are extensions of the lines FR at the right of FIG. 1, and continue to the right across FIG. 2 for connection to other local controllers as desired. Similarly the variable frequency or control lines FC of FIG. 2 are extensions of the lines FC of FIG. 1.

At the left side of FIG. 2 a group of three branch lines extend downward from the lines FR to supply the three phase reference frequency to three tapping points 120 degrees apart on the 360 degree continuous resistance forming the circular stator element of a 360 degree potentiometer PR20, dividing this stator element into three equal sections 21, 22 and 23. These three sections with their tapped connections to the three phase reference lines thus have a delta connected three phase arrangement as it is familiarly known in the electrical art, but with each section of the delta one third of a resistance circle.

The potentiometer PR20 is provided with a two part diametric rotor having two contacts insulated from each other and movable jointly over the circular stator to any diametrically opposite contact positions, the contacts always being 180 degrees apart. The left hand arm 24 as shown is connected to an outer central contact ring and the right arm 25 of the rotor is connected to an inner central contact ring. These rings are in turn connected respectively by familiar contact brush arrangements via wires 26 and 27 to the input winding 31 of isolating transformer T2, the output winding 32 of which is connected to the input of a spike pulse forming network 33.

Since the rotor arms 24 and 25 of potentiometer PR20 provide movable taps 180 degrees apart on the delta three phase connected stator, these rotor arms will take off a single phase sine wave voltage from the three phase reference voltage on the stator, this single phase voltage being at the reference frequency and having a phase relation to the latter depending on the position of the rotor 24—25. Thus by turning the rotor to the desired angular position, any desired phase displacement of the voltage output from the rotor can be obtained with respect to the original three phase reference frequency applied to the stator.

Linear resistance elements between taps give some angular error in relation to phase displacement but the appreciable width of the taps in the circular resistance at the 120 degree points provides a close approximation of an ideal sine wave rate of resistance distribution. In addition the use of 180 degree opposite rotor contact points serves to improve the linearity relation with three phase stators. The result of these several factors is that with the preferred potentiometer arrangements illustrated, and with commercial linear resistance elements between 120 degree taps, an overall deviation from linearity of phase-angle relation within 2% may be obtained.

There is also an appreciable variation in amplitude in relation to the angular position of the rotor of the 360 degree potentiometer, but this is not a factor in the preferred form of the invention, in view of the manner in which the pulse forming networks derive a narrow pulse near or substantially at the zero point of the wave.

It will be noted in FIG. 2 that the rotor 25—24 is shown as slightly displaced counter clockwise from a position extending from the tap between sections 23 and 22 of the stator, to the opposite section 21 of the stator, as one illustration, and a dial plate-knob arrangement (not shown) may be associated with the rotor 24—25 to indicate the angle of phase displacement or percentage displacement on the basis of 100 percent for 360 degrees of arm 25 with respect to the top center point as zero displacement, for example.

The single phase sine wave voltage, displaced from the reference frequency by the desired amount by potentiometer PR20, is thus applied via transformer T2 to the input at the top of the pulse forming network 33. This network is identified as a spike pulse forming network (as wave passes zero increasing) in its preferred form, of which one embodiment is shown and described in more detail in connection with FIG. 10. This spike pulse forming network derives a narrow spike pulse output at a particular point on the sine wave voltage applied to its input, this point being chosen for convenience as the wave becomes positive just beyond zero. For convenience of reference this is considered as substantially as the wave passes zero increasing toward the positive peak. It will be appreciated that some other reference point might be selected within the spirit of the invention, but this point is employed in the preferred form of the invention.

The spike pulse output of network 33 is applied via line 36 to one of the two inputs to coincidence gate CG1.

In the middle of FIG. 2 are shown three additional potentiometers PR21, PR22 and PR23, which are of the same type as potentiometer PR20 described above, and have individually adjustable rotors set in different desired phase displaced relation as indicated for example, to determine desired percentage response points in the total time cycle controlled by the master controller via the reference frequency and variable frequency lines FR and FC. These percentage response points are employed to control signal changes in a traffic signal cycle according to one aspect of the invention as more fully described below.

The stators of the potentiometers PR21, PR22 and PR23 are all connected in parallel in delta arrangement to the three phase variable frequency lines FC by the downward extending branch wires 41, 42 and 43, these wires being connected to corresponding tapping points on these three potentiometers respectively, spaced at 120 degree intervals around the continuous resistance of each stator.

The two arm rotors of these three potentiometers have one contact arm connected with an inner ring and the other connected with an outer ring, as in PR20 described above, and the arm associated with the inner ring is considered to be the phase displacement indicator for convenience in describing FIG. 2.

The rotor arms, 44, 45 and 46, are associated with the inner rings of potentiometers PR21, PR22 and PR23 respectively, and these arms are connected via the respective inner contact rings to individual contacts on the upper contact bank LS21 of a step-by-step selector switch, the opposite end arms of the respective rotors of potentiometers PR21, PR22 and PR23 and the associated contact outer rings being connected to corresponding individual contacts on the lower contact bank LS22 of this stepping switch respectively. The rotary contact wiper arms W21, W22, W23 and W24 of this stepping switch are associated with the respective contact banks LS21, LS22, LS23 and LS24, and are operated in ganged arrangement in clockwise rotation by the stepping switch motor magnet MM as indicated by the broken line 47 associating these several rotary contact arms with motor magnet MM. The rotation of these several contact arms is indicated by the curved arrows adjacent contact arms W21 and W22.

These several rotary contact arms W21, W22, W23 and W24 are shown as single ended for simplicity of illustration, and similarly only seven stationary contacts are shown on the associated contact banks, although it will be appreciated that additional contacts may be employed as needed and the rotary contact arms may be double ended or the like as desired to repeat the rotary traverse of the several successive stationary contacts beginning on the lowest contact position 1 as shown and continuing step-by-step to the uppermost seventh contact position shown and then directly thereafter to contact position 1 again, in which latter position the several rotary contact arms are shown in FIG. 2. The stepping switch operates only one step at a time in its cycle of contact positions upon each operation of its motor magnet MM, such operation including energization and release.

Considering the several contact positions of the stepping switch and their connections in more detail in FIG. 2, the inner contact ring and associated rotor arm 44 of potentiometer PR21 is connected via wire 51 to position 1 contact on bank LS21, and the opposite rotor arm and outer contact ring of potentiometer PR21 are connected via wire 52 to the corresponding position 1 contact of bank LS22, and thus in the condition illustrated in FIG. 2 the potentiometer PR21 is connected via the contact banks LS21 and LS22 and the respective rotary contact arms W21 and W22 to control a second spike pulse forming network 53 and a second input line 58 of the coincidence gate CG1 as will be further described below.

Rotary contact arms W21 and W22 are connected respectively via wires 54 and 55 to the input winding 56 of isolating transformer T1. The output winding 57 of this transformer is connected to the input of the spike pulse forming network 53 and the output of the latter is connected as indicated by line 58 to the second input of coincidence gate CG1.

The other input line 36 at the lower side of the coincidence gate CG1 was previously described as controlled by the spike pulse network 33, which is in turn controlled by the output of potentiometer PR20. This coincidence gate CG1 provides an output pulse on line 61 in response to the coincidence of pulses on the two input lines 36 and 58, to operate relay 62, which in turn by closing its contact 63, operates the stepping switch motor magnet MM. The other side of the relay 62 is returned to ground for example. The contact 63 is normally open with relay 62 deenergized, but when relay 62 is energized by the output pulse from coincidence gate CG1 as described, this contact closes to supply power, as indicated by the plus sign in a circle, via contact 63 and wires 64 and 65 to motor magnet MM, the left side of this motor magnet being connected to the negative power return, indicated by minus in a circle.

It will be understood that if reference and control frequencies of the order of 400 cycles per second are used, a series of coincidence pulses will occur in the coincidence gate circuit at the 400 cycle rate throughout the brief time width of overlap of the two spike pulses as one shifts slowly in phase with respect to the other. However as more fully described below, the coincidence gate circuit provides a rectified and capacitance filtered output substantially sustained between the successive pulses of the series, and thus the relay 62 remains energized throughout the series during the brief period of substantial coincidence, which is preferably of the order of a fraction of a second for example.

Operation of relay 62 energizes motor magnet MM for this fraction of a second period of substantial coincidence of pulses from the spike pulse formers 33 and 53 and then releases this motor magnet MM as the coincidence or overlap of such spike pulses ceases to be sufficient to operate the coincidence gate, and the output pulse from the latter ceases. This operation and release of motor magnet MM advances the rotary contact arms W21, W22, W23 and W24 from the lower position 1 shown to the next above position 2.

Thus as a result of phase coincidence of the outputs of the potentiometers PR20 and PR21, one output having adjustable phase relation to the reference frequency and the other output having adjustable phase relation to the control frequency, the stepping switch has been advanced from position 1 to position 2 in its cycle in desired phase relation to the time cycle between coincidences of the reference and control wave energies from the master controller, and this advance of the stepping switch has occurred at a desired percentage point in the locally offset time cycle determined by the relation between the rotors of the potentiometers PR20 and PR21.

In this discussion the setting of potentiometer PR20 is considered to be the locally offset zero reference for the several percentage settings of potentiometers PR21, PR22 and PR23.

In similar manner, potentiometer PR22 determines the percentage point in the time cycle at which the stepping switch will advance from position 3 to position 4 in the time cycle with relation to potentiometer PR20, and potentiometer PR23 determines the percentage point at which the stepping switch will advance from position 6 to position 7 in the time cycle with relation to potentiometer PR20, reading the position numbers in clockwise order on the stepping switch contact banks.

Thus the rotor arm 45 and associated inner contact ring of potentiometer PR22 are connected via wire 66 to the third contact (in position 3) on bank LS21, and the other arm of the rotor and the associated outer contact ring is connected via wire 67 to the corresponding third contact on bank LS22. Thus in the third position of the stepping switch the potentiometer PR22 is connected to the input of transformer T1 and thence via the pulse former 53 and line 58 for control of the coincidence gate CG1 in conjunction with potentiometer PR20, and therefore potentiometer PR22 controls the percentage point in the time cycle in relation to potentiometer PR20 at which the stepping switch is advanced from position 3 to position 4 by the coincidence gate via relay 62 operating the motor magnet MM.

Similarly the output from the rotor of potentiometer PR23 is connected from the inner and outer central contact rings via wires 68 and 69 respectively to corresponding contacts on banks LS21 and LS22 in the sixth position of the stepping switch, so that when the rotary contact arms W21 and W22 are in this sixth position potentiometer PR23 has its output applied to transformer T1 and thence via pulse former 53 and line 58 to control the coincidence gate and the consequent advance of the stepping switch at the desired percentage point in the time cycle in relation to potentiometer PR20.

Contact bank LS24 of the stepping switch in FIG. 2 shows a group of signal lamps in the form of circles designated AG, AY, BG, BY, CG and CY connected with individual contacts or groups of contacts, as an example of one type of output device which may be operated in desired parts of the time cycle controlled in part by the master controller and in part by the local controller.

Thus as one illustration the signal lamps AG, AY, CG, and CY may be connected to individual contacts at positions 1, 2, 6 and 7, respectively, and lamp BG may be connected to adjacent contacts in positions 3 and 4, and lamp BY may be connected to the following contact in position 5. Power may thus by applied to these signal lamps in turn from one power terminal indicated as plus in a circle, via rotary contact W24 and the associated stationary contacts in turn on bank LS24 as the stepping switch is advanced through its cycle, the left side of the several signal lamps being connected via the common wires 72, 73 to the negative power terminal.

The several signal lamps AG, AY, BG, BY, CG and CY may represent the respective green "go" and yellow clearance signals for three intersecting roads A, B, and C for example, or CG may represent a pedestrian exclusive "walk" signal for pedestrians to walk while other traffic is stopped. Although the corresponding red stop signals are not shown, their inverse association with the green signal or with green and following yellow are so well known that their illustration here is omitted to simplify the drawing.

It will be noted that an additional contact bank LS23 is employed in the stepping switch in FIG. 2. This bank and its associated connections to its left and below serve to illustrate how certain steps of the stepping switch cycle (and corresponding steps in the signal operating cycle of bank LS24 for example) may be controlled by local timing so as to maintain a desired locally adjusted but preset time length while the total time cycle and the steps controlled by the percentage potentiometers vary in time length under control of adjustment of the time rate of phase shift by the master controller.

Thus the yellow signal periods are preferably of a constant length such as three seconds each, while the total time cycle may vary from 40 seconds to 120 seconds in length for example.

Similarly one part of a signal display period may be timed locally and another part timed on a percentage basis under control of the total time cycle by the master, as illustrated for example in the division of the BG display period into two time intervals on adjacent signal contacts 3 and 4 on bank LS24 and on corresponding timing control contacts 3 and 4 on bank LS23 (in positions 3 and 4) of the stepping switch. Thus in this example the end of the time interval in the first of these positions (position 3) is controlled a percentage basis by potentiometer PR22 as previously described, but the second of these positions (position 4) is controlled on a locally preset time basis via contact bank LS23, as described more fully below, and thus this B green signal period is a compromise between percentage and preset time.

In other words, as the master controlled total time cycle increases, the total B green signal period overlapping positions 3 and 4 of the stepping switch will also increase but not as much, since the shift from position 3 to position 4 will occur at the preset percentage point in the cycle and the stepping switch will remain longer in position 3 with a slower timing rate of the master controller, but the stepping switch will then remain in position 4 for the same locally preset time despite the increase in the total cycle. Since the following position 5 for BY is also illustrated as locally timed, the next following position 6, which is percentage timed, receives the effect of the time difference which results from the successive positions 4 and 5 being preset while the positions 3 and 6 are percentage terminated.

Thus if the total cycle length is increased by the master controller, the end of B green and of the following B yellow comes earlier than would be the case on a percentage basis, and the additional time appears in the next following percentage period that of the CG display position 6 in the present example.

Obviously, within the scope of the invention, the signal display period can be divided into further parts if desired, as with a timed part followed by a percentage part followed by another timed part as one example, by rearrangement of the contacts on the several contact banks in relation to signals and local timing control and percentage timing control, and more or all of the signal periods could be divided between local timing and master controlled percentage timing. The CG period might be divided into percentage and timed parts as a vehicle traffic or pedestrian period, and thus increased less than the total time cycle while the next following green period, the AG period for the through road for example, would get the benefit of the additional time by incorporating a percentage controlled step in its period.

Considering now the operation of the timing bank LS23 and the associated timing units according to one embodiment of the invention as shown in FIG. 2, the timing is performed by a familiar method of charging a capacitor 74 slowly to the conduction voltage of gas discharge tube 75 to operate the time interval termination relay 76, the timing rate being varied as desired by control of the charging current by one of the several adjustable resistances 81, 82, 83 and 84, selected by the stepping switch.

These adjustable resistances 81, 82, 83 and 84 are connected via their adjusting taps for example, with individual contacts in positions 2, 4, 5 and 7 of contact bank LS23 as shown, the left ends of these resistances being connected via a common wire 85 and common minimum or current limiting resistance 86 to a direct current power supply. Thus these adjusting resistances respectively are connected via rotary contact arm W23 in their respective associated positions of the stepping switch via wire 87 to one side of capacitor 74, the other side of which is connected to ground for example.

The upper (positive) side of capacitor 74 is also connected via wire 91 to one side of gas discharge tube 75, the other side of tube 75 being connected via wire 92 and relay 76 to ground. Thus when one of the adjusting resistances is connected via bank LS23 in a desired position of the stepping switch, the capacitor is charged at the desired timing rate to conduction voltage of the tube 75, at which point the contained gas suddenly conducts to permit the capacitor to discharge through relay 76 to energize the latter and close its contact 96, which in turn connects power, from the terminal marked plus in a circle, via wire 65 to operate motor magnet MM to advance the stepping switch. As the motor magnet MM so operates, it closes its associated contact 94 to complete the discharge of capacitor 74 by connecting its upper side via wire 93, contact 94 and current limiting resistance 95 to ground.

It will be appreciated that other forms of timing might be used within the scope of the invention in relation to FIG. 2, one of which is shown in FIG. 10.

Although in the illustrated form of the invention of FIG. 2, locally timed steps are interspersed among the percentage timed steps controlled by the several potentiometers PR21, PR22 and PR23, one or more of such potentiometers might be used to provide desired operation at one percentage point only or at any desired number of such points in the time cycle, more or less than the three illustrated, within the teachings of the invention.

Referring now to FIG. 3, a somewhat more detailed illustration is given of one preferred form of master controller which may be employed in connection with one or more local controllers or local control features as illustrated in FIGS. 2, 4, 10 and 11. FIG. 3 shows the master controller in somewhat more detail than the block diagram form of FIG. 1 and also adds, at the lower part of FIG. 3, a schematic showing of the group of three offset control lines OC1, OC2 and OC which are controlled by the switches SW1 and SW2 in the master controller. These offset control lines are not required in the aspect of the invention illustrated in FIGS. 1 and 2 and described in connection therewith, although these offset control features may be added, as shown in the more detailed circuit forms of the invention according to FIG. 10, and these offset control lines, and associated parts of the master controller, are involved in connection with the remote selection between or among locally adjusted offsets as illustrated in FIG. 11 in somewhat simplified form, as well as in the similar feature illustrated in more detailed circuit form in FIG. 10.

Referring to FIG. 3 in more detail, the three windings of an alternating current three phase generator are shown schematically at the left and designated FRG as a group, to indicate that this is the generator of the three phase alternating current reference frequency provided on the lines FR extending to the right and corresponding with the similarly designated lines of FIGS. 1, 2, 4, 10 and 11. These lines extend to the right of FIG. 3 for connection to the local controllers.

Below the lines FR there is shown schematically the differential generator within the broken line box DG corresponding with the similarly designated block of FIG. 1, and the lines FC extending outward to the right. For convenience in explaining the invention in connection with FIG. 3, the parenthetical designation ($fc = fr + df$) is noted along side of FC. This is intended as a reminder that the control frequency output on the lines FC is the sum of the reference frequency and the difference frequency corresponding to the rate of phase shift provided in the differential generator.

It will be understood that the usual 120 degree spaced three phase windings 101, 102 and 103 at the left of the differential generator DG as shown in FIG. 3 will have a rotating field, and for purpose of illustration this is assumed to be the stator set of windings. The windings to the right with the associated three curved arrows are also 120 degree spaced windings forming the rotor of the differential generator for example. The lines FC extend from these latter rotor windings 104, 105 and 106 toward the right, and correspond with the lines designated FC in several of the other figures of the drawings.

A variable speed motor VSM is shown schematically below the rotor windings of the differential generator and is indicated as mechanically associated therewith to drive the rotor by the broken line 107. The motor VSM is illustrated as connected via wires 108 and 109, and the variable speed control SV, to positive and negative electrical power terminals indicated. The speed control SV is illustrated as a potentiometer adjustable for controlling the voltage or power applied to the motor VSM to vary the speed of the latter as desired to obtain the frequency difference $df$ between the reference frequency and the variable control frequency.

It will be understood that the motor VSM has a low speed output, provided by gearing or otherwise as desired, to rotate the rotor windings 104, 105, 106 at speeds of the order of one revolution in 40 seconds to one revolution in 120 seconds to derive a time cycle of the order of 40 seconds to 120 seconds for example as described above, one revolution of the motor output shaft being equal to one time cycle of the system. It will be understood by those skilled in the art that when the three phase rotor windings are rotated with respect to the three phase stator windings of the differential generator DG the output frequency from the rotor windings for example will have a phase shift with respect to the input at the stator windings which progresses at a time rate depending upon the rate of rotation of the rotor. In effect the turning of the rotor in the direction of the rotation of the field at the three phase stator windings will provide a slightly lower output frequency in relation to the input frequency which may be expressed $FC = FR - DF$ for example, whereas if the rotor windings are turned in the direction opposite to the rotating field of the stator windings the output will have a slightly increased frequency which may be represented by the expression $FC = FR + DF$ for example. For convenience in describing the invention it is assumed that the rotor windings always are turned in the same direction but at varying time rates to provide a variable time cycle for remote control purposes as described above.

In connection with the offset control lines in the lower part of FIG. 3, it will be noted that the switches SW1 and SW2 are connected at their left ends to the positive power terminal for example and are shown in a normally open position. The switch arm of either switch may be moved into its closed position independently to apply positive power to its associated line, the switch SW1 controlling line OC1 and the switch SW2 controlling line OC2, the remaining line OC being connected as a common line to the negative power terminal. It will be understood that the power terminals designated plus and minus are merely for convenience of identification and may be direct current or alternating current power as desired. The line OC1 alone may be energized by the closing of switch SW1 and the line OC2 may alone be energized by closing switch SW2 or both lines OC1 and OC2 may be energized by the closing of both switches. The switches SW1 and SW2 may be manually operated as desired by the traffic authorities at the master controller location or may be operated automatically in the form of relay contacts from time switches or from an automatic offset selector system as indicated in my prior Patent 2,542,978 referred to above.

A third switch SW3 is also provided in FIG. 3, and shown in open position but which may be closed if desired to connect positive power via wire 110 through the switch to line SC1 extending to the local controllers, for remote selection between percentage potentiometers associated with the lines FC, as by relay R6 and return line OC in FIG. 10, which may serve for remote control of the "split" of a traffic signal cycle for example.

Referring now to FIG. 4 there is shown in block diagram form two local controllers associated with two intersections along a common through street A, associated with the several sets of interconnecting lines extending from the master controller MC at the left. As in FIG. 3 the upper group of lines designated FR serve to carry the three phase reference frequency, the middle three lines extending from left to right designated FC carry the variable or control frequency, also three phase, and the lower three lines designated OC1, OC2 and OC serve as the offset control lines for example. The line SC1 immediately above serves for split control.

Along the lower part of FIG. 4 the common through street A is indicated as extending from left to right, with broken lines indicating that this street may extend further to other intersections in each direction and also indicating in the middle that the intersections may be much further apart than shown in the drawing. The intersection at the left has a crossroad or street designated B' and the intersection at the right may have the crossroad designated as B, and also shows another crossroad C for example. The traffic signals TS1 and TS2, associated with the respective intersections, are shown schematically as circles in the center of the intersection, and may of course have any desired form or location in accordance with common practice. These signals TS1 and TS2 are shown associated by lines 111 and 112 respectively with local controllers LC1 at the first intersection and LC2 at the second or right hand intersection. These local controllers are shown as connected with each of the three sets of lines on the master controller by groups of lines extending downward.

Referring now to FIGS. 5 through 9, a series of pulse forms are illustrated in relation to time scales to aid in a better understanding of the invention.

FIG. 5 for example illustrates successive stages in the formation of spike pulses from the control and reference voltages or wave energies, one of which is slowly shifting in phase at the desired time rate in relation to the other. For convenience in understanding the invention in relation to the several figures of the drawings it is assumed that the reference frequency is slightly lower than the variable or control frequency so that the reference frequency will slowly shift to the right on a time scale if the control frequency wave is considered stationary with respect to the time scale.

Thus referring momentarily back to FIG. 2 the reference frequency at the phase offset determined by potentiometer PR20 may be considered as shifting in phase clockwise or proceeding clockwise around the potentiometers PR21, PR22 and PR23 associated with the variable or control frequency, with each of the rotors of these potentiometers preset by local adjustment. Thus a given point on the reference wave output of the rotor of PR20 in FIG. 3 may be considered as proceeding clockwise around the stators of all of the potentiometers PR21, PR22 and PR23 and successively passing the rotor arms 44, 45 and 46 in the time cycle periodically repeated.

Correspondingly in FIG. 5 the reference frequency Vr indicated by the solid line wave in SUBFIGURE 5a may be considered as progressing toward the right on the time line indicated as t, this progression to the right being indicated by the small arrow extending from the wave Vr.

Reviewing this more fully SUBFIGURE 5a illustrates one cycle of the adjustably phase displaced voltage derived from the reference frequency and of the adjustably phase displaced voltage derived from the variable or control frequency superimposed on the same time scale, although it will be appreciated that these two voltages are actually applied to two different channels of pulse forming networks and input circuits to the coincidence gate. Thus although these two voltage waves are shown in SUBFIGURE 5a as superimposed on the same time scale for convenience of comparison, they are not to be considered as additive algebraically since they are in independent circuits applied to the individual pulse forming networks.

Similarly the pulses below in SUBFIGURES 5b and 5c, derived in two stages respectively from the sine voltage waves of 5a, are also shown superimposed for comparison purposes in the drawings only, since these are also actually in independent circuits or separate channels. In order to distinguish the pulses more clearly, particularly in the overlapped form in SUBFIGURE 5b, one of the voltage waves and the corresponding pulses below derived from the reference frequency are shown in solid line form, and the other set derived from the control frequency are shown in broken line form.

It will be understood that in SUBFIGURE 5a, for simplification of illustration, only one cycle of the wave Vr and only one cycle of the wave Vc are shown, although it will be appreciated that each is only one of a series of similar waves extending in each direction on the left to right time scale. Thus if the reference and control frequencies are of the order of 400 cycles per second for example, the one cycle waves illustrated will each have a time length of approximately 1/400 of a second.

In the several subfigures of FIG. 5 the wave Vc derived from the variable or control frequency is assumed to remain in a fixed position on the left to right time scale t, and the wave Vr derived from the reference frequency is assumed to be moving slowly to the right, that is to have a slow progressive phase shift toward the right. In the illustration of SUBFIGURE 5a the wave Vr is illustrated as about 60 degrees or 1/6 of the total cycle before coincidence with wave Vc and approaching coincidence.

It will be understood that the wave Vr of SUBFIGURE 5a may be considered to be derived or represent substantially the output from the rotor of potentiometer PR20 of FIG. 2 for example, and thus have a desired constant but adjustably preset phase displacement with respect to the reference frequency on lines FR. As more fully described below with reference to FIG. 11, if the wave Vr were slightly displaced in phase corresponding to the difference in positions of potentiometer PR20 of FIG. 2 and potentiometer PR7 of FIG. 11, this wave Vr could be considered to represent the output of the rotor of potentiometer PR7 of FIG. 11 or correspondingly the output of the potential divider RS of FIG. 11, both of which latter outputs are in phase in the position of PR7 shown.

Similarly in SUBFIGURE 5a the voltage wave Vc may be considered to represent the output of the rotor of potentiometer PR22 for example having a constant but adjusted preset phase displacement with respect to the variable or control frequency on lines FC, although with slightly shifted but preset position along the time scale the wave Vc might also represent the output from the rotor of the potentiometer PR21 or the output from the rotor of the potentiometer PR23 for example.

Thus the wave Vr represents what may be considered a locally derived reference voltage wave or wave energy having a preferably locally adjusted (but possibly permanently set, if desired), phase relation to the reference frequency wave energy from the master controller, and the voltage wave Vc represents similarly a locally derived wave energy having a preferably locally adjusted (but possibly permanently set) phase relation to the control frequency wave energy from the master controller.

For the present, for a better understanding of the invention with relation to FIG. 2 for example let it be assumed that the voltage wave Vr represents the output from the rotor of potentiometer PR20 and the voltage wave Vc represents the output of the rotor of the potentiometer PR22 of FIG. 2, in the immediately following discussion. The voltage wave Vr is shifting to the right on the time scale approaching coincidence with wave Vc, and if a total time cycle of 60 seconds were assumed, the wave Vr is approximately of 1/6 of the cycle or 10 seconds before coincidence with the wave Vc. Thus these two waves represent substantially the wave forms and their relative phase positions as applied to the respective spike pulse forming networks leading to the coincidence gate CG1, the wave Vr being applied via transformer T2 to the input of the pulse former 33 and the wave Vc being applied via transformer T1 to the pulse former 53 (if the stepping switch is assumed at the moment to be in position 3 instead of the position 1).

These spike pulse forming networks have two stages, as more particularly described in connection with FIG. 10, leading to a narrow spike pulse output as illustrated in SUBFIGURE 5c, the SUBFIGURE 5b indicating an intermediate stage at which a substantially square wave pulse is formed, from which the spike pulse of SUBFIGURE 5c is derived at the leading edge of the square wave pulse. As shown in SUBFIGURE 5b, the respective spike pulse forming networks 33 and 53, by the use of limiter circuits for example, derive the substantially square wave pulse Vrs from the upper or positive half of the wave Vr of SUBFIGURE 5a and the broken line substantially square pulse Vcs from the upper or positive half of the wave Vc of SUBFIGURE 5a, these two square pulses having the same phase relation as their associated waves above in SUBFIGURE 5a, with the square wave pulse Vrs shifting slowly toward the right on the time scale toward coincidence with the pulse Vcs.

At a further stage in the pulse forming networks the very narrow spike pulses illustrated in SUBFIGURE 5c are derived from the corresponding square wave pulses of SUBFIGURE 5b above, this being accomplished by differentiating circuits for example. Thus the spike pulse Pr of SUBFIGURE 5c is derived from the front edge of the square pulse Vrs above, and the broken line spike pulse Pc is derived correspondingly from the square pulse Vcs above. These pulses appear on the upper or positive side of the time scale. Smaller pulses are illustrated below the time scale as Prn and Pcn as the corresponding negative pulses derived from the right hand or lagging edge of the respective square pulses Vrs and Vcs above. These latter negative pulses are made smaller than the positive pulses in the spike pulse forming networks, and although they also appear in the outputs from these networks and thus at the input of the coincidence gate CG1, the coincidence gate is designed to respond only to the positive pulses indicated above such as P$r$ and P$c$ and does not respond to the negative pulses P$rn$ and P$cn$, as described more fully in connection with the more detailed circuit diagram of FIG. 10. Thus for practical purposes it may be considered that the distinctive outputs of the respective pulse forming networks are the pulses P$r$ and P$c$.

It will be understood that in the several FIGURES 5, 6, 7, 8 and 9 the spike pulses are for convenience of illustration in the drawing shown considerably wider than they actually would be in practice. In a preferred actual embodiment of the invention for example it has been found that spike pulse widths may be employed of the order of $\frac{1}{200}$ of one cycle of the wave itself, whose period might be of the order of $\frac{1}{400}$ of a second, so that the spike pulse shown in FIG. 5c might actually be of the order of $\frac{1}{80000}$ of a second.

FIG. 6 illustrates several successive time positions of the spike pulses of SUBFIGURE 5c in proceeding from the approximate position of FIG. 5c to and beyond coincidence. SUBFIGURE 6a shows the spike pulses P$r$ and P$c$ on separated but corresponding time scales one above the other, representing the two pulse output channels 36 and 58 for example, in the positions of the corresponding pulses in SUBFIGURE 5c. SUBFIGURE 6b illustrates the same pulses a short time later at coincidence, the pulse P$r$ having moved somewhat to the right on the time scale. SUBFIGURE 6c illustrates the same two pulses P$r$ and P$c$ on corresponding time scales a short time after coincidence, the pulse P$r$ continuing to move further to the right beyond coincidence.

The pulses illustrated in FIGS. 7, 8 and 9 relate to the automatic homing of a local potentiometer PR7 to a phase relation with respect to the reference frequency wave energy corresponding to a remotely selected one of a plurality of locally adjusted potentiometers associated with the reference frequency lines from the master controller as illustrated in FIG. 11, or in the more detailed circuit form of FIG. 10, and described further below in connection therewith. Thus FIGS. 7 through 9 are described in connection with FIG. 11 and the related aspects of FIG. 10 later in the specification.

Referring now to FIG. 10 there is shown a more detailed schematic circuit diagram of a preferred embodiment of a local controller combining several features of the invention cooperatively in one system, particularly adapted for operation in a traffic control system of the general type illustrated in block diagram in FIG. 4 and involving master control of the total time cycle for traffic signals for example, with master controlled expansion and contraction of the time cycle, master controlled change of split of the time cycle, and master controlled selection between severally locally adjusted offsets of the individual local time cycles at the individual local controllers, and with smooth transition of the local time cycle from one such offset selection to another, the local time cycle being partly distributed on a percentage basis by locally adjusted percentage potentiometers to expand and contract with the total time cycle, and also involving local timing of the yellow or clearance signal, along with parts of other signal periods desired, so that the local timing of the several local controllers may be individually adjusted locally while being also jointly adjusted and synchronized by the master controller, and thus the local time cycle is controlled and timed partly from the master controller and partly from the local controller.

Considering the several parts of the circuit diagram of FIG. 10 in general groups at first, the variable frequency or control lines FC, coming from the master controller and extending to other local controllers also, are shown in the upper left part of the figure. The reference frequency lines FR are shown in the upper center of the figure, and the offset control lines OC1, OC2 and OC are shown in the upper right part of the figure.

Three potentiometers PRA1, PRA2 and PRB are shown associated with the control lines FC. Three potentiometers PR4, PR5 and PR6 and the fixed potential divider RS and a return line 242 for the latter are shown associated with the reference frequency lines FR, as is also an additional potentiometer PR7.

Immediately to the left of potentiometer PR7 there is a reduction gearing and reversible motor drive assembly RDM for providing an automatic rotary drive for the rotor of potentiometer PR7 for homing this rotor to a position to correspond with whichever one of the potentiometers PR4, PR5 or PR6 or the fixed potential divider RS is selected by remote control from the master controller, to establish a desired offset or phase displacement of the local time cycle in relation to the reference frequency on lines FR.

Below the potentiometers PR4, PR5 and PR6 are two relays R4 and R5 with the contacts associated with these respective relays indicated by the horizontal dashed lines connecting the relay coils with the several moving contacts. The contacts of these relays are shown in their normal resting positions, with both relays R4 and R5 deenergized, corresponding to the switches SW1 and SW2 both being open in the master controller as shown in FIG. 3, and the wires OC1 and OC2 consequently both being deenergized.

Below the potentiometers PRA1 and PRA2 are contacts of a relay R6 controlled via line SC1 from the master controller for remote selection between these potentiometers for percentage control of one step of the time cycle for example.

Below the potentiometers PRA1, PRA2 and PRB are two contact banks LS1 and LS2 of a stepping switch, and at the lower left part of the figure is a third contact bank LS3 of the same stepping switch. The motor magnet which operates to advance the stepping switch is indicated at the lower right of the figure, and designated MM, although it will be understood that this is mechanically associated with the rotor contact arms or wipers W1, W2 and W3 of the respective stepping switch banks LS1, LS2 and LS3.

In general in the lower two thirds of the figure are three pulse former networks PF1, PF2 and PF3, arranged in a vertical column at the left and three coincidence gate circuits CG1, CG2, CG3 and their associated output relays, arranged in a column at the right and each with its input at the left side and output at the right side.

These three pulse former circuits PF1, PF2 and PF3 are indicated in general by the dashed line blocks so designated and are associated on their input sides with the respective transformers T1, T2 and T3 at the left, and the coincidence gate circuits CG1, CG2 and CG3 are similarly indicated by dashed line blocks and control the respective output relays R1, R2 and R3 at the right. The pulse former of each horizontal row extends to the right of the output winding at the right of its associated transformer about one third of the way across the figure as indicated by the broken line block designated PF1 in connection with the lowermost row, and the coincidence gate circuit is in general at the right half of each row as indicated in the broken line block designated CG1 for example in connection with the lowermost row, but the pulse former of each row is not necessarily associated only with the coincidence gate of the same row, as will be described below.

In the intermediate vertical zone between the three pulse former blocks and the three coincidence gate blocks are certain cross connections between pulse formers and coincidence gates, and other connections as will be more fully described below.

The lowest of the three coincidence gate blocks, CG1 and its output relay R1, is concerned at its output end with control of the stepping switch magnet MM to control the advancing step-by-step of the stepping switch in certain steps as desired. The pulse former PF1 is concerned at its input end with the output of the potentiometers PRA1, PRA2 and PRB, establishing the locally adjusted percentage points for the control of the advancing of the stepping switch at the desired steps in its cycle, in association with the control lines FC from the master controller, the output of pulse former PF1 being supplied to the input of coincidence gate CG1.

The middle pulse former PF2 is concerned at its input end with the output of the potentiometer PR7 via transformer T2, the output of potentiometer PR7 serving as what might be called a local reference voltage, which in its normal stable condition on completion of its homing operation is in phase with the output whichever one of the several potentiometers PR4, PR5 or PR6 or potential divider RS is selected by remote control from the master controller, the potential divider RS and all of the several potentiometers just mentioned being associated with the reference frequency line FR.

As more fully described below the output from potential divider RS or one of the potentiometers PR4, PR5 or PR6 is selected by operation of either one or both of the relays R4 or R5 over the offset control lines OC1, OC2 and OC from the master controller, and the reversible motor unit RDM is controlled by the outputs of the middle and upper coincidence gates of FIG. 10 to drive the rotor of potentiometer PR7 in the nearest direction at a relatively slow rate to coincidence of phase displacement with the potential divider or one of the three potentiometers selected by the master controller to determine the offset of the local controller cycle.

It will be understood that from the moment of change in offset selection by the master controller until the rotor of potentiometer PR7 has completed its rotation in its homing operation to coincide with the newly selected offset or phase relation, the output of potentiometer PR7 will be slowly changing in phase, and will be controlling pulse former PF2 in FIG. 10 during such change as well as when at rest in its final position. The output of this pulse former PF2 will be applied to the input of the coincidence gate CG1 for comparison with the output of pulse former PF1 to control the stepping switch in each desired percentage controlled point in its cycle. However, as more fully explained below, the output of pulse former PF2 is also applied to the coincidence gates CG2 and CG3 to control the homing operation of the rotor of potentiometer PR7 by means of the reversible motor RDM. In this connection the coincidence gate CG2 is employed to stop the motor at coincidence of the output voltage wave of PR7 with the output of the selected voltage wave of potential divider RS and line 242 or one of the potentiometers PR4, PR5 or PR6.

The output of pulse former PF2 is also applied to the input of the coincidence gate CG3, the output of which controls relay R3 which controls the direction of rotation of the reversible motor RDM, this being acomplished by phase comparison of the spike pulse output of pulse former PF2 with the square wave output of the pulse former PF3 of FIG. 10, this latter pulse former having both a square wave output and a spike pulse output.

The third contact bank LS3 and its associated wiper W3 of the stepping switch, shown in the lower left part of FIG. 10, are employed in conjunction with capacitor 120 and one input circuit 158 of the coincidence gate CG1, to provide local timing in certain steps of the time cycle of the stepping switch as desired, and in a novel manner, differing from FIG. 2 by employing the coincidence gate CG1 under direct control of the timing capacitor 120 in such locally timed steps, in addition to using the same coincidence gate in percentage steps of the cycle to determine phase coincidence for termination of such percentage steps. Thus in the form of the invention illustrated in FIG. 10 the gas discharge tube 75 and its associated relay 76 and contact 96 of FIG. 2 are not required.

In the circuit illustrated in FIG. 10 the local timing is made effective in certain positions of the stepping switch contact bank LS3 by connecting desired timing rate charging circuits to capacitor 120, which is associated with the input wire 158 of coincidence gate CG1 to control the grid bias of one of the two control grids of the coincidence gate tube, the progressive variation of the charge on capacitor 120 in timing serving to bring the bias on this control grid of the coincidence gate tube from a relatively high negative blocking value to a point near zero bias at which the tube can pass plate current if the other control grid is also at a sufficiently low negative or near zero bias. In the corresponding positions of the stepping switch contact banks LS1 and LS2, the several potentiometers are all disconnected from the input side of the transformer T1 and thence from the input of the pulse former PF1, the input side of the transformer T1 being shunted by cross connections in these positions between the contacts of banks LS1 and LS2 for stabilization.

Thus in the timing positions of contact banks LS3, since the pulse former PF1 has its input disconnected, this pulse former provides no output to the line 158 and this line is controlled only by the time controlled charging of the capacitor 120.

In the positions of the stepping switch in which it is desired to have the percentage control from the control frequency lines FC via the locally adjusted potentiometers, the capacitor 120 is disconnected from the timed charging rate control adjustable resistors on bank LS3 and in these positions one of the several potentiometers associated with the control lines FC is connected by the contact banks LS1 and LS2 to the input of transformer T1 and thence to the input of the pulse former PF1 to control the input line 158 at the coincidence gate on a percentage basis instead of a timed basis. In such positions the capacitor 120, while still being connected via resistor 121 to the line 158, is also connected via resistor 122 and wiper W3 at the appropriate position of contact bank LS3 and wire 123 to a desired bias potential at tap 124 on resistance 125 serving as a potentiometer.

The potentiometer 124—125, or more particularly its resistance element 125, is a part of a potential divider series from positive D.C. power at a terminal 115 via resistance 126, wire 127, resistance 125 and resistance 128 to ground at junction 132, in series. Capacitor 131 is connected between wire 127 and junction 132 at ground, this combination serving to provide an operating potential for the cathodes somewhat above ground, and more positive normally than the point at tap 124 associated with the control grids via the respective resistors 121, 180, 225 and 232, and thus establishing a normal negative bias relation between these control grids and the cathodes of the several coincidence gate tubes. The cathodes of the several coincidence gate tubes are connected via wire 133 to the wire 127 at the upper or positive side of capacitor 131.

Since the coincidence gate circuit CG1 in FIG. 10 is representative of the corresponding coincidence gate circuits CG2 and CG3 above, and since the pulse former circuit PF1 and its associated transformer T1 are representative of the pulse former circuits PF2 and PF3 above and their associated transformers T2 and T3, except for a dual purpose output arrangement in connection with pulse former PF3 as further described below, only pulse former PF1 and its associated transformer T1, and coincidence gate CG1 will be described in detail.

The pulse former PF1 corresponds to the spike pulse former 53 of FIG. 2 and is identical in form to the latter. The coincidence gate circuit CG1 of FIG. 10 corresponds with the similarly designated coincidence gate circuit of FIG. 2.

It will also be noted that in general the input line 158 and input line 159—173—175—177 of CG1 of FIG. 10, correspond to lines 58 and 36 respectively of FIG. 2, and the output relay R1 of FIG. 10 corresponds to the relay 62 of FIG. 2 at the output of CG1.

The input side or winding 56 of the transformer T1 is connected via wires 134 and 135 to wipers W1 and W2 respectively of the stepping switch contact banks LS1 and LS2. The capacitor 136 is connected across these wires at the input winding 56 of transformer T1. This capacitor tunes the input winding of the transformer to the voltage wave on the lines 134—135, as for example 400 cycles per second as mentioned above. This capacitor reduces the loading of the transformer on the potentiometers PRA1, PRA2 and PRB, and reduces the amount of error between the mechanical position of the potentiometer rotor and the actual phase angle of the output voltage from the potentiometer rotor contacts.

The input transformer T1 preferably steps up the sine wave voltage somewhat, and at its output winding 57 applies this stepped up voltage via resistor 137 to the control grid 141 of the first triode section 145 of the pulse forming circuit PF1, the other side of the transformer output winding 57 being connected at junction 143 to the cathode of this triode section and to ground. Thus this tube section 145 is operated at zero bias, and as soon as the positive half cycle of the input sine wave occurs, the grid draws current causing a voltage drop across the resistor 137. This causes the positive half of the wave to be limited to a low value, and when the negative half of the wave appears at the input it swings the grid 141 to negative bias beyond cutoff. The plate 144 of tube 145 is connected to junction 142 and thence via resistor 146 and wire 147 to the B plus power supply.

Therefore the voltage on the plate 144 appearing on junction 142 has a low positive or substantially zero value corresponding to the positive half of the original sine wave input at transformer T1, and has a partially squared positive pulse form corresponding to the negative half of the original sine wave input.

By means of the coupling capacitor 151 this pulse form is applied across the load resistance 152, and via the series grid resistor 153 to the grid 154 of the second triode tube section 155. The capacitor 151 is connected between junction 142 and junction 148. Resistor 152 is connected between junction 148 and ground.

The resistor 153, between junction 148 and the grid 154, serves for grid limiting on the positive half of the partially square pulse wave input at this grid so that the pulse output of this tube section 155, at its plate circuit 156, provides a substantially square wave. The cathode of this tube section is connected to ground at 157, and the plate circuit 156 is connected from junction 161, via resistor 162 to wire 147 and the B plus plate supply voltage.

The square wave pulse output of the plate circuit 156 at junction 161 is differentiated by capacitor 163 in conjunction with resistor 121 to apply a sharp narrow spike pulse in the positive direction to the upper control grid at input circuit 158 of the coincidence gate circuit CG1, corresponding to the point at which the square wave pulse crosses zero rapidly to become positive, and corresponding with the same relative transition point of the original sine wave for example.

It will be appreciated that this spike pulse output is relatively positive in relation to the normal negative bias of this grid of the coincidence gate tube 165, as established by the circuit including resistance 121 connected from the junction point 164 at the left end of line 158 and the right side of condenser 163, and continuing via wire 171, junction 172, resistance 122, wiper W3 and the stationary contacts of bank LS3 connected to wire 123 and thence to junction 129, wire 138, to tap 124 of the potentiometer providing the adjusted grid bias for the two control grids of the coincidence gate tube 165.

It will be appreciated that a positive spike pulse is provided at the output side of capacitor 163 corresponding to one side of the square wave input at the left side of this capacitor and a negative spike pulse at the opposite end of such square wave input. The operating points of triode sections 145 and 155 are chosen to develop a strong narrow positive pulse and the negative spike pulse may be of somewhat less amplitude and sharpness than the positive spike pulse, but in any event the negative pulse serves to further bias the coincidence gate tube grid 167 connected to the line 158, and thus is ineffective in making this tube conducting.

The coincidence gate tube 165 is of the general type having two control grids both of which must be substantially zero or positive bias to make the tube pass any appreciable plate current. Thus the upper control grid 167 of the coincidence gate tube 165 and the lower control grid 168 jointly control this tube in relation to its cathode 169.

Thus the pulse former PF1 in two stages associated with the tube sections 145 and 155 provide a square wave pulse, as generally illustrated in FIG. 5b in response to the sine wave input to transformer T1 from the lines 134—135 from the percentage determining potentiometers above, and the capacitor 163 in conjunction with the load resistance 121 and its associated circuit connections to the desired normal grid bias point, provides the narrow spike pulse forms generally indicated in FIG. 5c, this spike pulse output being provided on the input line 158 to coincidence gate CG1.

The input to the lower control grid 168 of the coincidence gate tube 165 is connected to an isolating resistance 173, the left side of which is connected to the wire 175 extending upward to connect with the other two coincidence gates above in FIG. 10. This line 175, at junction 176, connects with wire 177 extending to junction 189 at the output side of a differentiating capacitor 170 in the pulse former PF2 and at the upper side of load resistance 180 of this pulse former, the resistance 180 being connected between junction 189 on wire 177 and junction 139 on wire 236, and thence via wires 236, 138 to the grid bias potentiometer tap 124, and thus the line 177—175, 173, 159, corresponds in a general way with the line 36 indicated in block diagram form in FIG. 2. The isolating resistance 173 may be considered a part of this line or it might be included in the same grid circuit within the coincidence gate CG1 and considered a part of the latter.

The pulse former PF2 of FIG. 10 generally corresponds with the spike pulse former 33 of FIG. 2, associated with the locally displaced reference frequency wave energy. The pulse former PF2 provides a sharp spike pulse output in similar fashion to that described in connection with pulse former PF1, but in corresponding relation to the locally displaced reference wave energy, and this spike pulse is applied to all three of the lower grids of the respective coincidence gate tubes, coincidence gates CG1, CG2 and CG3, in each case via isolating resistances as described in connection with resistance 173 for CG1.

Thus this spike pulse, locally phase displaced as desired in relation to the reference frequency wave energy on the lines FR from the master controller, is applied to the three coincidence gate circuits for phase comparison with the other wave energy inputs to their respective other control grids, and in the case of the coincidence gate circuit CG1 is compared with the percentage point phase related output of the pulse former PF1 to actuate the coincidence gate circuit CG1 to operate its output relay R1 to actuate the stepping magnet MM of the stepping switch at the corresponding percentage points of the cycle.

The spike pulse output of the pulse former PF2 on the lines 177 and 175, and applied to the several lower control grids of the coindence gate tubes, corresponds with the spike pulse Pr appearing in FIGS. 5 and 6.

This pulse also corresponds with the spike pulses Pr shown in FIGS. 7, 8 and 9 as will be further described below.

Continuing now with a description in more detail of the coincidence gate circuit CG1 as representative of the several such circuits designated CG1, CG2 and CG3 of FIG. 10, the coincidence gate tube 165 and its two control grids 167 and 168 have previously been mentioned. The cathode 169 of this tube is connected to line 133, and via this line to the wire 127 to establish a cathode potential normally more positive than the two control grids as provided by the potential divider and potentiometer arrangement previously described extending from the positive line 115 to the ground terminal 132, with the capacitor 131 between the wire 127 and the ground terminal 132. The plate circuit 178 of this coincidence gate tube is connected via resistance 181 and wire 182 to the B plus supply terminal.

The screen grid of the coincidence gate tube 165 is connected via wires 183 and 182 to the B plus supply terminal.

In the percentage potentiometer controlled positions of the stepping switch, the normal bias applied to both of the control grids of the coincidence gate tube 165 is sufficient to keep the tube biased well beyond cutoff. Any negative pulses only add to this bias and the tube remains cut off. The positive pulse output of the respective pulse formers into the two control grids of this coincidence gate tube are of sufficient amplitude to overcome the applied bias, and if both the control grids are positive at the same time, as in coincidence of these pulses, plate current flows in the gate tube 165 and a negative pulse appears at the plate circuit 178. The coupling capacitor 184 applies this pulse from the plate circuit 178 across the load resistor 186, and to the control grid 187 of triode tube section 185, this grid circuit being connected to junction 188 between capacitor 184 and resistance 186, the lower end of resistance 186 being connected to the B plus power supply, to which also the plate circuit 191 is connected.

It will be appreciated that the output pulses at the plate circuit of tube 165 are repeated during the brief coincidence period, at the frequency of the reference and control lines which has been assumed for example to approximate 400 cycles per second, and thus during the coincidence or overlap of the pulse outputs of the two pulse formers which are being compared in the coincidence gate circuit, the capacitor 184 passes each of the series of the coincident pulses.

The cathode 192 of the tube 185 is connected in a series through resistance 193 to ground. The output from this tube circuit is taken from leads 194 and 196 across the cathode load resistance 193, and this tube circuit thus serves as a cathode follower, which avoids loading the coincidence gate tube and obtains a low impedance driving source for the next following rectifier circuit associated with the diode tube section 195.

The upper end of the resistor 193 at the cathode circuit 192 is connected via wire 194 to the left side of capacitor 197, the right side of which is connected via wire 198 to the cathode circuit of diode 195 at junction 201. The lower side of resistance 193 at ground is connected via wire 196 to the plate circuit of the diode 195 at junction 202.

Thus each of the series of brief negative pulses, at the 400 cycles per second rate and of a time length of the order of 1/200 of each such cycle for example, at coincidence, appear as a reduction in voltage across the cathode load resistance 193, and quickly discharge capacitor 197 via diode rectifier 195. During the remaining period between pulses of the series, that is for the remaining more than 99% of each cycle of the 400 cycles per second for example at coincidence the capacitor 197 will be recharging via resistance 206, due to the normal higher voltage existing across resistance 193 between negative pulses and at non-coincidence.

The charging time of capacitor 197 via resistance 206 is sufficient so that, for the over 99% of the time period of the 400 cycles per second waves between negative pulses of successive waves, there exists a sustained positive average voltage across resistance 206 with respect to ground. At junction 203 this average direct current voltage at coincidence is applied to the control grid of a direct current amplifier tube section 205 illustrated in triode form, and this reduces the bias of the grid with respect to the cathode in this tube 205, so as to operate relay R1 in the anode-cathode circuit. The brief negative pulse on the control grid while capacitor 197 is discharged is of such short duration that the anode current through the coil of relay R1 does not fall sufficiently to release the relay. Thus relay R1 is operated throughout the period of coincidence of the two positive spike pulses at the input of the coincidence gate CG1.

The plate of tube 205 is connected via wire 211 to the upper side of the coil of relay R1, and the lower side of this coil is connected via wire 212 to the positive power supply terminal on wire 221. The cathode of tube 205 is connected via wire 213 and wire 214 to junction 216, between two resistors 217 and 218, providing a potential divider circuit between ground, at the lower end of the resistance 217, and the positive power supply at wire 221 and junction 222 at the upper end of resistor 218.

Thus since the cathode of tube 205 is connected to a point above ground potential at junction 216 on the potential divider, and the control grid of tube 205 is connected normally to ground potential via resistor 206 and leads 207, 196 in the absence of any coincident input pulses to the coincidence gate circuits, this provides a normal bias for the control grid of tube 205 to deenergize relay R1 under this condition of noncoincidence.

As discussed above upon the coincidence of input pulses the capacitor 197, diode 195 and resistance 206 combination applies a direct current positive voltage to the control grid of tube 205 which will overcome the normal negative bias and make the anode-cathode circuit of this tube sufficiently conducting to operate relay R1.

Although the capacitor 197 is sufficiently large to sustain the operation of relay R1 between the rapidly repeated brief negative pulses at the 400 cycle per second rate for example during coincidence, it is not sufficiently large to continue to hold relay R1 operated for any substantial period of time after the end of such coincidence. Thus relay R1 will be released properly after the end of coincidence after a brief but negligible time lag resulting from the recharge of capacitor 197.

Thus with this description of the coincidence gate circuit CG1, the operation of the similar coincidence gate circuits CG2 and CG3 above will be understood. It will be noted in this connection that the cathodes of the direct current amplifier tube sections at the output ends of the latter two coincidence gate circuits are connected in common with the cathode circuit 213 of the lower coincidence gate circuit CG1 via wire 214 to the desired potential at junction 216, and similarly the lower sides of the coils of relays R3 and R2 are connected via wire 223 in common with the lower side of relay R1 to the positive power on wire 221 at junction 222.

Similarly at the input ends of the several coincidence gate circuits the cathodes of the coincidence gate tubes of the circuits CG3 and CG2 are connected in common via wire 133 with the cathod of the coincidence gate tube 165 at wire 127 to the desired operating potential.

The pulse former circuits PF2 and PF3 are identical with that described above for pulse former PF1, except that the pulse former PF3, in addition to the spike pulse output on line 224, also provides a substantially square wave pulse output from the plate circuit of the output tube section 355 of pulse former PF3 via wire 226, capacitor 227 to the upper input control grid of the coincidence gate tube of the circuit CG3 at junction 229 via current limiting resistance 228. Capacitor 231 shunts capacitor 227 and the resistance 228, from wire 226 to the upper control grid also to provide a better squared pulse at the control grid. This capacitor 231 is connected from the junction with the lead 226 at the top of capacitor 227 to the junction between the upper control grid and the right hand end of resistor 228.

For convenience in the drawings, particularly in FIG. 10, the common bias and cathode potential supplies on wires 138 and 133 respectively, and related operating point potentiometer 124—125 and resistors 126, 123 and capacitor 131, are not included within the blocks designating the coincidence gates CG1, CG2 and CG3 since they are in large part common to the several coincidence gates and its is obvious that separate such operating point controls and the like might be employed individually and included within the coincidence gates if desired. The isolating resistances 173, 237 and 179 might also be included within their respective coincidence gate blocks, if desired.

Similarly the blocking capacitor and return resistor combination 227 and 232, and the current limiting resistor 228 and its by-pass pulse aiding capacitor 231, are illustrated outside of the blocks PF3 and CG3 for convenience in the drawing in FIG. 10, but these elements could be included in PF3 or CG3 or divided between the two blocks.

The circuit including capacitor 227 and the resistance 228 and the shunt capacitor 231, provides a substantially square wave pluse to the upper control grid of the coincidence gate tube of the coincidence gate circuit CG3, whenever the sine wave input to the pulse former PF3 is on its positive excursion, this square wave pulse also appearing across the load resistor 232, which is connected between the junction 229 and the lead 233, the latter connecting the lower side of this resistor via lead 236 to the junction 129, wire 138 to tap 124, on the potentiometer 124—125 setting the desired operating point above ground for the normal bias potential of the control grids of the coincidence gate tubes.

Thus the upper control grid of the coincidence gate tube of the upper coincidence gate circuit CG3 goes substantially positive throughout the full positive half of the sine wave output from whichever one of the potentiometers PR4, PR5 or PR6, or potential divider RS is selected by the master controller through the operation of the relays R4 and R5, the contacts of these relays associating the output of only one of these several elements at one time via wires 334 and 335 to the input side of the transformer T3, and thence from the output of this transformer to the input of the pulse former PF3.

With both relays R4 and R5 deenergized in the condition illustrated in FIG. 10 for example, the center tap line 241 of potential divider RS is connected in mid-relation to the sine wave voltage appearing across the outer two of the lines FR, and the wire 242 is connected to the middle of the three lines FR, the lines 241 and 242 being connected via contact combinations in the deenergized condition of both relays R4 and R5 to the wires 334 and 335 respectively, and thence to the input side of the pulse former PF3.

Thus the sine wave input to the pulse former PF3 bears a predetermined phase relation to the three phase reference frequency wave energy on the reference lines FR from the master controller. Therefore, the coincidence gate CG3 has its upper control grid controlled by the square pulse output corresponding to the positive half of this sine wave. Its lower control grid is connected via isolating resistance 179, wire 175, junction 176 and wire 177, to the spike pulse output of the pulse former PF2 derived from the output of the potentiometer PR7. Thus the latter grid will receive a spike pulse at the beginning of each positive half of the sine wave output of potentiometer PR7. If this positive spike pulse output from PF2 derived from potentiometer PR7 occurs within the positive half of the sine wave output from the potential divider RS in relation to line 242, as the selected input among the several remotely selectable such inputs for pulse former PF3, the coincidence gate tube will conduct and the coincidence gate circuit CG3 will therefore operate its output relay R3 throughout the period of overlap of the spike pulse from PF2 and the square pulse from PF3.

However, if the spike pulse output of PF2 applied to the lower control grid does not fall within the positive half of the sine wave as determined by the square wave positive pulse output of PF3 at the upper control grid of the gate tube, in other words if the positive spike pulse output of PF2 occurs during the negative half of the sine wave output of the potential divider RS in relation to wire 242, the upper control grid of the gate tube will not be sufficiently positive and despite the continuing spike pulses on the lower control grid this gate tube will not conduct, and the coincidence gate circuit CG3 therefore will not operate its output relay R3 so that the latter will be in the deenergized condition under the circumstances last described. The effect of operation or release of relay R3 will be described more fully below, where it will be seen that the operated or released condition of relay R3 determines the direction of drive of the reversible motor assembly RDM for rotation of the rotor of potentiometer PR7.

The spike pulse output of pulse former PF3 appears on line 224, in similar fashion to the spike pulse output of pulse former PF1 at junction 164 and line 158 as described above. Thus the spike pulse output of PF3 is carried via wire 224 and line 218 to the upper control grid of the gate tube of coincidence gate CG2, this spike pulse output appearing also across the load resistor 225 connected via leads 236 and 138 to the tap 124 establishing the desired operating potential for normal bias of the control grid. The lower control grid of the gate tube of coincidence gate CG2 is controlled via the isolating resistance 237 from the line 175 to which the spike output pulse from pulse former PF2 is provided via wire 177.

Since the upper control grid at the input of CG2 is controlled by the spike pulse output of pulse former PF3 associated with the wave energy on lines 334—335 derived from the reference frequency lines FR in predetermined phase relation as selected by relays R4 and R5, and since the lower control grid at the input of coincidence gate CG2 is controlled by the spike pulse output from pulse former PF2 in the phase relation determined by the position of the rotor of potentiometer PR7 with respect to the wave energy on the reference frequency lines FR, therefore when these two spike pulses are in coincidence, which will be when the rotor of potentiometer PR7 is in a position corresponding to that of the selected element controlled by relays R4 and R5, and in the assumed deenergized position, corresponding to the phase position of the wave energy between the center tap of potential divider of RS and the line 242, the coincidence gate CG2 will be operated by the conduction of its gate tube, which will operate its output relay R2 as long as such coincidence occurs. The relay R2 is sustained between the pulses of the series at the 400 cycles per second rate during the coincidence period, as discussed above.

Thus the relay R2 will be operated to stop the motor driving the rotor of potentiometer PR7 when it is in coincidence with the mid-tap position of the potential divider RS as more fully described below.

The circuit connections from the contacts of relays R2 and R3 controlling the two directional driving coils CCW and CW of the reversible motor RDM will now be described.

The relay R2 at the output end of the coincidence gate CG2 has a moving contact r21 and a fixed back contact r20, and in the energized condition assumed due to coincidence of pulse inputs, r21 is disconnected from r20 as shown. However, when there is noncoincidence between the spike pulse outputs of the pulse formers PF3 and PF2 applied to CG2 as previously described, the relay R2 will be deenergized and r21 will be connected to r20.

Similarly the relay R3 has an associated moving contact r31 and two fixed contacts, including a back contact r30 and a front contact r32. The moving contact r31 is shown in its back contact position connected with contact r30, the contacts r31 and r32 being separated. This condition corresponds with the assumption that in the last homing operation of the rotor of potentiometer PR7 under control of the reversible motor RDM, the rotation was clockwise, as will be obvious from the further description below, corresponding to a condition of non-coincidence of the spike pulse output of pulse former PF2 and the square pulse output from the pulse former PF3 with relay R3 deenergized.

Thus with relay R2 energized and with relay R3 deenergized under the conditions assumed and illustrated in FIG. 10 the rotor of potentiometer PR7 will be stopped at the desired coincidence position, since the common power supply for both windings CW and CCW of the motor RDM will be interrupted at contacts r21—r20 in view of the following circuit. The common junction 243 between the two windings CW and CCW of the motor RDM is connected via wire 244 to the alternating current power terminal designated A.C. minus for example. The other end of the winding CW, that is the upper end, is connected via wire 246 to the back contact r30 of relay R3. The left end of the winding CCW of the motor RDM is connected via wire 247 to the front contact r32 of relay R3. The lower pivot end of the moving contact r31 of relay R3 is connected via wire 248 to the back contact r20 of relay R2. The moving contact r21 of this relay is connected via wire 249 to the other A.C. power terminal indicated as A.C. plus.

The two windings CW and CCW are the directional drive windings for clockwise operation and counterclockwise operation respectively of a self-starting synchronous motor in RDM for example, and operated from the alternating current power supply A.C. plus to A.C. minus. Since the A.C. plus side of the power supply on wire 249 can be connected only by the closure of contact r21 and contact r20, and these contacts are assumed to be open at the moment with relay R2 energized in the home condition assumed for potentiometer PR7, the motor coils CW and CCW are both deenergized, irrespective of the position of the contact r31 of the relay R3, and the motor RDM will be stopped with the rotor of potentiometer PR7 at rest in this condition.

However, if it were now to be assumed that a change in selection of offset had just been made by the master controller through the relays R4 and R5, the outputs from the rotor of potentiometer PR7 and from the selected one of the potential divider or potentiometers to the right of PR7 and associated with the reference lines FR would no longer be in coincidence, and this would cause coincidence gate CG2 to release its relay R2 and close its back contacts r21—r20. Thus the A.C. plus side of the power supply would be extended from wire 249 via contacts r21 and r20, now assumed to be closed, and wire 248 to the contact r31 of relay R3.

If it is now assumed that the newly selected offset position, provided by one of the potentiometers PR4, PR5 or PR6 for example, is displaced clockwise of the existing rotor position of potentiometer PR7, or in other words is nearer to the latter in a clockwise driving direction for PR7 than in a counter clockwise driving direction, the new homing position will be less than one-half cycle of the sine wave away in a clockwise direction from the old homing position and the spike pulse output of PF2 derived from potentiometer PR7 at the beginning of the positive half of the sine wave of such output will fall in the negative half of the square wave output of PF3 derived via the lines 334—335 from the selected potentiometer, both of such outputs being related to the reference frequency. Thus the positive square wave output of pulse former PF3 and the positive spike pulse output of pulse former PF2 would not be in coincidence at the input of coincidence gate CG3 and the relay R3 would thus be in deenergized condition. Therefore, contact r31 would be connected with contact r30 to further extend the A.C. plus power via wire 246 to the clockwise winding CW to drive the motor RDM and consequently the rotor of potentiometer PR7 in a clockwise direction toward coincidence with the new selected offset.

This assumed condition of R2 deenergized with r21—r20 closed and R3 deenergized with r31—r30 closed would continue to operate the motor by the winding CW in the same direction until coincidence were to be achieved, at which point the rotor would be stopped by the coincidence of the output spike pulses from the pulse formers PF3 and PF2, thus energizing relay R2 is previously described, and opening the contacts r21—r20.

If it were now to be assumed however that the newly selected offset relation were such that the shortest direction of rotation for the rotor of potentiometer PR7 to its new corresponding position would be counter clockwise, then the noncoincidence of the spike pulse outputs from PF2 and PF3 would deenergize relay R2 again at the output of coincidence gate CG2 to reclose contacts r21—r20, but coincidence of the positive spike pulse output of PF2 and the positive square pulse output of pulse former PF3 at the input of coincidence gate CG3 would cause relay R3 to be energized to open its contacts r31—r30 and close its contacts r31—r32. Thus under this assumed condition the A.C. plus power would be extended from wire 249, via the assumed closed contacts r21—r20, wire 248, the now assumed closed contacts r31—r32, and wire 247 to the winding CCW, to drive motor RDM and consequently the rotor of potentiometer PR7 in a counterclockwise direction toward coincidence with the newly selected offset.

Thus is will be observed that by virtue of this novel feature of the invention the rotor of potentiometer PR7 will never rotate more than 180 degrees to its newly selected offset position from its previously selected offset position, but will rotate in the shortest direction either clockwise or counterclockwise as required. Since the output from the rotor of potentiometer PR7, in desired phase relation to the wave energy from the master controller on the reference lines FR, is compared in coincidence gate CG1 with the output from the respective rotors of the percentage determining potentiometers in desired phase relation to the wave energy from the master controller on the control lines FC, the local offset of the reference pulse of the time cycle is determined for the succession of coincidences with the percentage control pulses from the several percentage determining potentiometers in the time cycle.

It will be observed that in the stable condition, with the rotor of potentiometer PR7 having reached its position corresponding to the newly selected offset, this offset relation will remain the same until a change by a new selection from the master controller, or of course by any local manual adjustment of the rotor of whichever of the potentiometers PR4, PR5 or PR6 happens to be controlling the position of PR7 at the moment. However, from the time of such change of desired offset, either by selection from the master controller over the offset control lines and relays R4 and R5, or by local adjustment of a particular potentiometer of this group which may happen to be selected, the rotor of the potentiometer PR7 turns relatively slowly from its old offset position to its new offset position. This slow rotation may be provided by the reduction gearing indicated by the box G serving as a part of the motor RDM, and which is shown associated by the dashed line 251 with the rotor shaft of potentiometer PR7, and is also shown by the dashed line 252 below it to be associated with the rotor element of the motor RDM.

In this connection it will be understood that the rotor of the potentiometer PR7 is rotatable through a maximum angle of 180 degrees by action of the coincidence gate control circuits making phase comparison of its output with the output of the desired offset selecting potentiometer, but the rotor itself is physically capable of continuous rotation and the maximum automatic rotation of 180 degrees may take part in any phase relation to the entire 360 degree stator.

The rate of rotation of the rotor of potentiometer PR7 by the motor RDM is preferably of the order of one revolution in 6 to 12 minutes, where a maximum total signal time cycle of the order of 2 minutes is employed, for example, in which case the maximum half cycle change of offset would be completed in 1½ to 3 signal cycles, and the greatest effect in cycle timing during such maximum change would be about 33% increase or decrease for the ⅙ r.p.m. rate of 16½% for the ¹⁄₁₂ r.p.m. rate. Obviously a faster rate of rotation for potentiometer PR7 may be employed where a lower maximum time cycle is employed.

This feature of enabling the offset of the local controller to be shifted in this smooth progressive manner in the shortest direction but at a desirably slow rate between one offset relation and another, has the effect of merely slowing down the local time cycle or speeding it up slightly and distributing this gain or loss in time over the various percentage points and periods terminated thereby in the time cycle in a substantially even manner, and is of great significance in traffic control systems, in avoiding any abrupt change from one offset relation to another. The distribution of the gain or loss in time over the signal cycle is quite important in avoiding excessively long stopping periods for traffic and consequent traffic congestion in connection with changes of offset, especially if there is a major change in offset, and the ability to move in the shortest direction either clockwise or counterclockwise as required to the new offset position is also of great benefit in avoiding long traffic stoppages, as will be evident in considering a change of offset to be made from one offset point which is just about to be reached in the time cycle to another offset point which has just been passed in the time cycle, since in the latter case if it were necessary always to turn in the same direction the signal operation might be held up for a complete cycle before the new offset relation can be effective to produce a signal change.

Thus applicant's system of smooth change in the shortest direction for each offset change has a great advantage not only over former systems of direct immediate change from one offset relation to another but also over former systems employing offset interrupter arrangements for releasing the local signal controller to proceed through its time cycle with a lag of the order of a quarter of the time cycle for example to spread the lag in change of offsets over several time cycles.

Prior offset change systems to my knowledge have the handicap of affecting one green signal period for example and always in the time lengthening direction, whereas the present invention provides for change in either the time lengthening or time shortening direction whichever is the quicker in producing the offset change, and not only divides a major change into smaller changes spread over one or more signal cycles as needed but spreads such changes also over the several percentage controlled periods in each signal cycle, so that the present invention has a minimum of disturbance of signal split and a minimum time of out-of-phase relationship in connection with any offset change.

Traffic authorities will appreciate that the minimizing of such disturbances of the signal cycle in connection with offset change is very important in the progressive type of signal systems designed to permit traffic to proceed at a substantially constant speed through a series of signalized intersections in the system, without stopping more than once.

One of the outstanding advantages of the applicant's system in contrast to prior systems, is that by going in the shortest direction either clockwise of counterclockwise as required during the change of offset, the present system avoids having the signal cycle pass through a substantially 180 degree out-of-phase relationship to its proper coordination with adjacent intersections, and which if not avoided would cause multiple stopping of large fleets of vehicles at successive intersections, a condition from which it is most difficult for a progressive system to recover in heavy traffic.

The relative positions of the spike pulses from pulse formers PF2 and PF3 and the square pulse from pulse former PF3, under the several conditions above assumed in connection with changes of offset selection, are shown in FIGS. 7, 8 and 9 in which the several pulses are shown on similar time scales one above the other.

FIG. 7 illustrates the condition of coincidence of the positive spike pulses with the beginning of the positive square wave pulse, which is the condition of rest for the motor RDM, with the rotor of the potentiometer PR7 also at rest in its home position corresponding to one of the selected offsets of the potentiometers PR4, PR5 or PR6 or the potential divider RS and its associated line 242. In FIG. 7 the substantially square pulse Vr11 illustrated in SUBFIGURE 7a represents the positive square output pulse from pulse former PF3 at wire 226 for example which is applied to the upper control grid input of the coincidence gate CG3, as previously described. The spike pulse Pr11 shown in SUBFIGURE 7b above the line represents the positive spike pulse output of the pulse former PF3 on line 224 for example, which is applied to the upper control grid of the coincidence gate CG2 at the input side of the latter.

The pulse Pr11 is shown directly under the beginning of the positive square wave pulse Vr11, a relation which is always maintained on the time scales. The negative pulse Pr11n shown below the line in SUBFIGURE 7b corresponds with the right hand end of the square pulse Vr11, and since the coincidence gate responds only to the positive pulses this negative pulse is neglected.

In SUBFIGURE 7c the positive pulse Pr above the line is shown in the same time position as the pulse Pr11 above it, and the pulse Prn below the line is the corresponding negative pulse which is neglected since it does not influence the coincidence gate circuit. The pulse Pr in SUBFIGURE 7c corresponds with the pulse Pr indicated in FIGS. 5 and 6 above, in the sense that these pulses are all derived from the reference frequency as locally determined in desired phase relation to such reference frequency, and in the case of FIG. 10 for example the pulse Pr of FIG. 7 represents the spike pulse output of pulse former PF2 on line 177 and 175 applied to the lower control grids of the inputs of the several coincidence gate circuits CG1, CG2 and CG3, and derived from the sine wave output from the rotor of the potentiometer PR7. In the stable condition assumed in FIG. 10 with the rotor of potentiometer PR7 in the offset position corresponding to the output from the potential divider RS and its associated line 242, these pulses will be in coincidence as shown in FIG. 7.

In FIG. 8 it is assumed, as previously discussed above in connection with FIG. 10, that a change of selection of offset has been made by the master controller to which the homing operation of the rotor of PR7 has not had time to fully respond. FIG. 8 illustrates the condition in which the newly selected offset represented by the pulses Vr12 and Pr12 is to the left on the time scale with respect to the position of the rotor of potentiometer PR7 resulting from the previous offset, represented by the pulse Pr. This is a condition in which the pulse Pr must move to the left as indicated by the small arrow associated with it in SUBFIGURE 8c toward coincidence with the pulse Pr12 above, and consequently illustrates the counterclockwise rotation of the rotor of potentiometer PR7 by the operation of the winding CCW, by the combination of relay contacts r21—r20 being closed and relay contacts r31—r32 being closed, and this consequently represents the condition of relay R2 being released and relay R3 being energized as previously described above. It will be noted in this connection that the pulse Pr falls within the period or phase position of the positive half of the square wave represented by Vr12 above, the spike pulse Pr being from the output of the pulse former PF2 and the spike pulse Pr12 and corresponding square pulse Vr12 being from the output of the pulse former PF3.

The counterclockwise drive and corresponding movement to the left of the pulse Pr illustrated in FIG. 8 will continue until pulse Pr coincides in position with the pulse Pr12, at which coincidence the drive of the motor RDM will be stopped and the rotor of potentiometer Pr7 will stop in its new position because of the coincidence of pulses and consequent operation of relay R2 by coincidence gate CG2.

The condition illustrated in FIG. 9 is another assumed condition opposite to that of FIG. 8. This condition illustrated in FIG. 9 represents a relation of the pulse outputs of the pulse formers PF2 and PF2 derived from the output of the potentiometer PR7 and of the selected offset from one of the potentiometers PR4, PR5 and PR6 or potential divider RS and associated line 242, where the newly selected offset is to the right on the time scale with respect to the old one, or in a clockwise position with relation to the old position of the rotor of potentiometer PR7, so that the pulse Pr must move to the right and the rotor of PR7 must be rotated in a clockwise direction to coincide wtih the newly selected offset position. This is the condition described above in connection with FIG. 10 in which the relay contacts r21—r20 are closed and the relay contacts r31—r30 are closed with both relays R2 and R3 released, to cause energization of the winding CW for clockwise rotation of the rotor of potentiometer PR7 toward coincidence with its new home position.

It will be noted in FIG. 9 that the square pulse Vr13 in SUBFIGURE 9a and the spike pulse Pr13 below it are in the same relation to each other but both of these pulses are to the right of pulse Pr shown in SUBFIGURE 9c. Thus this illustrates the condition of non-coincidence of the spike pulse Pr representing the positive pulse output of pulse former PF2 and the square pulse Vr13 representing the positive square pulse output of pulse former PF3 in the present assumed condition. The spike pulse Pr13 represents the positive spike pulse output of pulse former PF3 in this present assumed condition.

In view of the noncoincidence of pulses Pr and Vr13 in the assumed condition of FIG. 9, the coincidence gate CG3 controlled by the phase comparison of these pulses will not be operated and its output relay R3 will therefore be released. Similarly, because of the noncoincidence of pulses Pr and Pr13 as illustrated in the assumed condition of FIG. 9 the coincidence gate CG2 controlled thereby will also not be operated and its output relay R2 will be released. This combination of conditions with relay R3 released and relay R2 released will continue until the clockwise driving of the rotor of potentiometer PR7 has brought it into position to correspond with the new offset relation and consequently will have brought pulse Pr into coincidence with pulse Pr13 at some time after the condition illustrated in FIG. 9. When such coincidence has ben reached coincidence gate CG2 will be operated to energize its relay R2, and the relays R2 and R3 will thus be in the positions shown in FIG. 10.

Considering now the circuits via the several contacts of relays R4 and R5 for selectively connecting the wires 334—335 to the potential divider RS or one of the several potentiometers PR4, PR5 or PR6 associated with offset selection, it will be observed that the relay R5 has two moving contacts and two associated sets of back contacts and front contacts, and the relay R4 has four moving contacts and four associated sets of back contacts and front contacts. The moving contacts of both relays R4 and R5 are shown in their normal released position, touching their back contacts, which is the condition with the relays R4 and R5 deenergized, corresponding to the lines OC1 and OC2 being deenergized, with the switches SW1 and SW2 in the master controller open as ilustrated in FIG. 3. In this condition the moving contacts of both relays are separated from their associated front contacts.

If relay R4 were to be energized by the closure of switch SW1 in the master controller for example its moving contacts r41, r49, r413 and r45 would separate from their associated back contacts and close against their associated front contacts. Correspondingly if relay R5 were to become energized by the closing of switch SW2 in the master controller its moving contacts r51 and r55 would separate from their associated back contacts r50 and r54 and close against their associated front contacts r52 and r56.

In the case of relay R4 the moving contact r41 is associated with back contact r40 and front contact r42, the moving contact r49 is associated with back contact r410 and front contact r48, the moving contact r413 is associated with the back contact r412 and front contact r414, and the moving contact r45 is associated with the back contact r44 and the front contact r46.

The moving contacts associated with relay R5 are shown associated with the operating coil designated R5 to the left, this association being illustrated by the dashed line extending from the coil to the moving contacts. Similarly, the coil of relay R4 is illustrated as associated with its moving contacts, the coil R4 being to the right of these contacts.

Considering now the several circuit connections controlled by these relays, it will be noted that the lines 334 and 335 extending from the input of the transformer T3 are connected to the moving contacts r51 and r55 respectively of relay R5. The potential divider RS and the several potentiometers PR4, PR5 and PR6 are connected to different front or back contacts of relay R4 as follows. The center tap of potential divider RS is connected via wire 241 to the back contact r40. The associated line 242 extending from the center conductor of the group of lines FR, is connected to the back contact r410.

The three phase delta connected input taps of the potentiometers PR4, PR5 and PR6 are shown connected in parallel from the upper sides of these potentiometers in FIG. 10 to the respective reference lines above. The lower sides of these respective potentiometers PR4, PR5 and PR6 represent the rotor output taps or connections. The left rotor tap of potentiometer PR4 is connected via wire 341 to front contact r48 and the right rotor tap is connected via wire 342 to front contact r42. The left rotor tap of potentiometer PR5 is connected via wire 343 to front contact r414 and the right rotor tap of PR5 is connected via wire 344 to front contact r46. The left rotor tap of potentiometer PR6 is connected via wire 345 to back contact r412 and the right rotor tap of PR6 is connected via wire 346 to back contact r44.

The several moving contacts of relay R4 are connected to front or back contacts of relay R5 as follows. The moving contact r41 is connected via wire 351 to back contact r50, the moving contact r49 is connected via wire 352 to back contact r54, the moving contact r45 is connected via wire 353 to front contact r52, and the moving contact r413 is connected via wire 354 to front contact r56.

The effect of these connections of the relay contacts of relays R4 and R5 is that in the condition illustrated of both relays being deenergized the potential divider RS is connected via wire 241, back contact r40, moving contact r41, wire 351, back contact r50, moving contact r51, to wire 334 and thence to the upper end of the input of transformer T3 associated with the upper pulse former PF3; and the line 242 associated with the potential divider RS as a return circuit is connected via back contact r410, moving contact r49, wire 352, back contact r54, moving contact r55, to wire 335 and thence to the lower end of the input of transformer T3.

Under this condition, as may be readily traced in more detail if desired by following the circuit lines associated with the several relay contacts, the potentiometer PR4 and the potentiometer PR5 are disconnected since they are associated with the several front contacts of relay R4, which contacts are separated from the moving contacts in the deenergized condition as described. The potentiometer PR6 is also disconnected, since although it is associated with the back contacts r412 and r44, which are now closed to moving contacts r413 and r45 respectively on relay R4, the latter moving contacts are not connected to lines 335 and 334 via wires 354 and 353 at r56 and r52 respectively since the moving contacts r51 and r55 are separated from the last mentioned front contacts.

If it were now assumed that the relay R4 were to be energized by energization of wire OC1 by the closing of switch SW1 at the master controller, while relay R5 remained deenergized, the potential divider RS and its associated line 242 would be disconnected from the lines 334—335, and the potentiometer PR4 would be connected to these lines to provide the input to the transformer T3 and its associated pulse former. Under these assumed conditions, with only relay R4 energized, the moving contacts r41, r49, r413 and r45 would be shifted to the right, disengaging from their back contacts and engaging their front contacts. This would have the effect of disconnecting the center tap of potential divider RS and line 242 by the opening of contacts r40—r41, and by the opening of contacts r410—r49 respectively, and would have the effect of connecting potentiometer PR4 by the closing of contacts r41—r42 and contacts r49—r48.

Similarly, if it is desired to select the offset determined by potentiometer PR6, the switch SW2 in the master controller will be closed, with the switch SW1 opened, and only the wire OC2 will be energized to energize relay R5 while relay R4 will remain deenergized. Under these new assumed conditions, with relay R5 alone energized, the several contacts r41, r49, r413 and r45 would remain in their back contact positions as illustrated in FIG. 10, and the moving contacts r55 and r51 would be shifted from their back contact positions shown to their front contact positions, thus opening contacts r55—r54 and contacts r51—r50 to assure disconnection over the circuits previously traced via moving contacts r41 and r49 to the potential divider circuits 241—242 or to the potentiometer PR4, and thus also closing contacts r55—r56 and r51—r52 to cause the connection of potentiometer PR6.

The latter connection may be traced from wire 335 via contacts r55—r56, wire 354, contacts r413—r412, and wire 345 to the left side of potentiometer PR6, and from wire 334 via contacts r51—r52, wire 353, contacts r45—r44 and wire 346 to the other side of potentiometer PR6. Potentiometer PR5 would be disconnected since it is associated with the front contacts r46 and r414, which would be separated from their associated moving contacts r45 and r413 under the assumed condition of deenergization of relay R4.

If it is now assumed that both relays R4 and R5 were energized by the closing of both of the switches SW1 and SW2 in the master controller for example, all of the moving contacts of both of these relays would be shifted from their back contact positions illustrated in FIG. 10 to their front contact positions, and the circuit of potential divider RS and wire 242 and of potentiometer PR4 would be disconnected by the opening of contacts r50—r51 and r54—r55.

Under this newly assumed condition of relays R4 and R5 both energized, potentiometer PR5 would be connected in place of potentiometer PR6 by the shift of the moving contacts r45 and r413 from their back contact positions to their front contact positions. It will be obvious that potentiometer PR6 would be disconnected since it is associated with the back contacts r412 and r44, and that potentiometer PR5 would be connected since it is associated with the front contacts r414 and r46.

Under this latter assumed condition the wire 335 would be connected via contacts r55—r56, wire 354, contacts r413—r414, and wire 343 to the left side of potentiometer PR5, and wire 334 would be connected via contacts r51—r52, wire 353, contacts r45—r46, and wire 344 to the right side of potentiometer PR5.

Thus it will be observed that by remote control of the relays R4, R5 and their associated contacts, one of the four different offset possibilities provided by potentiometers PR4, PR5, PR6 and potential divider RS in conjunction with its associated line 242, may be selected for connection to the input circuit of pulse former PF3 via its associated transformer T3 and the associated lines 334 and 335.

As one example of use of this apparatus in traffic control, the potentiometers PR4, PR5 and PR6 might be set in relation to corresponding potentiometers in other local controllers for outbound progression, average or two way progression and inbound progression respectively, and the potential divider RS and associated lines 241—242 might serve for simultaneous signal operation, at a series or number of related intersections.

Referring now to the several potentiometers in the upper left part of FIG. 10 and the associated stepping switch and related connections in more detail, these potentiometers PRA1, PRA2 and PRB are connected in parallel with the control frequency lines FC from the master controller in the three phase delta manner at their stators like the potentiometers PR21, PR22 and PR23 of FIG. 2, but the potentiometers PRA1, PRA2 and PRB and their associated stepping switch banks and the like are shown somewhat differently in FIG. 10 to illustrate another form of distribution of the time cycle and also to illustrate one form of selection or change of cycle distribution or split by remote control from the master controller.

The lower side connections of these potentiometers PRA1, PRA2 and PRB in FIG. 10 represent the connections of the rotors corresponding to the lines coming out to the right of the potentiometers PR21, PR22 and PR23 of FIG. 2, but their connections with the stepping switch are somewhat different as described below.

The potentiometers PRA1 and PRA2 are associated one at a time with the left hand position number 1 of the stepping switch banks LS1 and LS2 to provide a selection between two different percentage points for controlling the point in the time cycle at which the stepping switch will step from position 1 to the next position 2 to the right, which may represent the control of termination of the A street green period in a traffic signal cycle for example either directly, or indirectly through initiation of a brief locally set timing period in position 2 for example.

The selection between potentiometers PRA1 and PRA2 for association with position 1 of the stepping switch, is made by the relay R6 and its associated contacts, the dashed line extending from the coil of the relay R6 to its moving contacts r65 and r61 to indicate this association. The relay R6 is controlled via the line SC1 from switch SW3 in the master controller for example, the return line from relay R6 being illustrated as the line OC, which is the common return wire for the offset control lines also for example.

The selection between these two potentiometers depends upon the energized or deenergized condition of relay R6 and consequent shift of the moving contacts r61, r65 to the left or remaining to the right as illustrated, since the potentiometer PRA1 is associated with the front contacts and the potentiometer PRA2 is associated with the back contacts of the relay R6.

Thus the left side of the rotor output of potentiometer

PRA1 is connected via wire 261 to the front contact r66, and the right side of this rotor is connected via wire 262 to the front contact r62. The left side of the rotor of potentiometer PRA2 is connected via wire 263 to the back contact r64, and the right side of this rotor is connected via wire 264 to the back contact r60. The moving contact r65 is connected via wire 265 to the stationary contact in the first (left-hand) position of contact bank LS2 of the stepping switch, and the moving contact r61 is connected via wire 266 to the corresponding stationary contact in position 1 of the contact bank LS1 of the stepping switch.

Thus in the position shown with relay R6 deenergized corresponding to the open position of switch SW3, the potentiometer PRA1 is disconnected at the open contacts r65—r66 and r61—r62, and potentiometer PRA2 is connected via wire 263, contacts r64—r65 and wire 265 to contact 1 on contact bank LS2, the other side of potentiometer PRA2 being connected via wire 264, contacts r60—r61, wire 266 to contact 1 on contact bank LS1 of the stepping switch.

If it were desired to provide a different percentage point for the control of stepping from position 1 of the stepping switch the relay R6 could be energized thus disconnecting PRA2 and connecting PRA1 to the respective stationary contacts 1 of the contact banks LS1 and LS2 by the opening of contacts r64—r65 and r60—r61 and the closing of contacts r65—r66 and r61—r62, as may be readily traced from the above circuit description.

The potentiometer PRB is shown in FIG. 10 as permanently associated with position 4 (reading from the left end) of the contact banks LS1 and LS2 of the stepping switch, which might control the percentage point for the green period of B' street in a traffic signal cycle for A and B' streets for example. It will be noted that the left side of the rotor taps of potentiometer PRB is connected via wire 267 to contact 4 on contact bank LS2 and the right side of this rotor of potentiometer PRB is connected via wire 268 to the corresponding contact 4 on contact bank LS1.

It will be understood that the switching from one percentage point to another in the time cycle by remote selection between potentiometer PRA1 and PRA2 as illustrated, is one form of controlling the split or distribution if the local time cycle, since it may control directly or indirectly the termination of the part of the cycle allocated to A street green for example, and if the percentage point controlled by potentiometer PRB for controlling directly or indirectly the termination of the B' green part of the time cycle remains set the proportion of the time cycle allocated between A and B' streets will be changed.

It will also be appreciated that the selection illustrated for one step only in the time cycle is only one form of selection of remote control of split or cycle distribution since by adding more contacts to relay R6 and more potentiometers a selection may be made for more or all percentage steps of the cycle if desired, applying the teachings of the invention illustrated in connection with PRA1 and PRA2. It will be appreciated that by adding further relays and associate contacts, a selection might be made between three or more potentiometers or percentage point controls for any of the same steps of the stepping switch cycle as desired, merely by employing the teachings of the invention in connection with relays R4, R5 and their associated potentiometers in place of the relay R6 and its associated potentiometers. In other words by obvious changes or substitutions in view of the teachings of the invention several potentiometers may be selectively connected between the lines FC and the lines 265 and 266 by substituting the potentiometers and relays and relay contact arrangements associated with relays R4 and R5 for the potentiometers PRA1 and PRA2 and the relay R6 and its associated contacts.

Considering the time cycle illustrated in the stepping switch positions of FIG. 10, more fully, it will be observed that position 1 is illustrated as controlled by a percentage point potentiometer from the line FC, and position 4 is illustrated as controlled by another percentage point potentiometer from the line FC, while the intervening positions 2 and 3 have corresponding contacts of the banks LS1 and LS2 cross connected, that is contacts 2 are connected together on banks LS1, LS2 as are also contacts 3. Similarly contacts 5 of the two banks LS1 and LS2 are connected together and contacts 6 of the two banks are connected together. This cross connection of the two banks in positions 2, 3, 5 and 6 serve to connect a shunt across the input 56 of transformer T1 for stability of operation in the positions which are locally timed and thus not connected to any percentage point controls.

Correspondingly, on the contact bank LS3 of the stepping switch it will be noted that contacts of positions 1 and 4 are connected together to the line 123 for establishing proper operating bias for the lower control grids of the several coincidence gates at potentiometer 124—125, and the contacts of positions 2, 3, 5 and 6 of bank LS3 are connected via individual adjustable resistances 276, 277, 278 and 279 to a positive direct current power source at line 147. These resistances control the timing in the respective positions, by controlling the rate of charging of the timing capacitor 120, the resistance 276 controlling the timing in position 2, the resistance 277 in position 3, the resistance 278 in position 5 and resistance 279 in position 6.

These several locally timed positions may correspond with the second parts of the green signal periods for streets A and B' divided into percentage timed and locally timed parts, and the following yellow clearance signal periods, with the percentage controlled positions corresponding to the first parts of the green signal periods, for example.

It will be noted that in FIG. 10 only a six step cycle of positions is illustrated in the stepping switch for simplicity, since a somewhat different form of signal cycle is illustrated in FIG. 2 and other forms of cycle arrangements are discussed above in connection with FIG. 2. Thus the six step cycle of FIG. 10 may illustrate a percentage timed position 1 and timed position 2 as two parts of the A street green signal period, and position 3 may illustrate the following locally timed yellow clearance period. Similarly, position 4 and position 5 may illustrate percentage timed and locally timed parts respectively of a B' street green signal period, with the following position 6 representing the locally timed yellow clearance signal period for B'.

It will be appreciated however that by adjustment of resistors 276 and 278 the locally timed parts of the green signal periods may be reduced to a negligible value if desired so that the stepping switch steps quickly through the positions 2 and 5, and consequently the percentage points established for stepping from position 1 to position 2 and for stepping from position 4 to position 5 may effectively establish the termination of the A green and B' green signal periods respectively. Alternatively the positions 2 and 3 could be employed for two successive stages of clearance signal indications and positions 5 and 6 could be similarly arranged, or further timed positions added for successive stages of clearance, as desired.

Although no additional contact bank of the stepping switch for output connections to traffic signals for example is shown in FIG. 10, it is obvious that such bank or banks may be added within the spirit of the invention and in view of teachings of the invention along the lines of the contact bank LS24 and associated signals as shown in FIG. 2, but with the signal connections to the several positions rearranged slightly as desired to conform with the cycle of steps illustrated in FIG. 10. Thus in FIG. 10 an A green signal might be connected to be operated in positions 1 and 2, an A yellow signal in position 3, a B' green signal in positions 4 and 5 and a B' yellow signal in position 6. In such arrangement an A red signal might be connected to be operated in positions 4, 5 and 6 and a B red signal might be connected for operation in positions 1, 2 and 3 by means of an additional contact bank on the stepping switch for example.

Also obviously further positions and signal connections and appropriate potentiometers could be added for a third set of green and yellow signals if it is desired to divide the total time cycle into three traffic right of way periods or two vehicle traffic right of way periods and a pedestrian period for example, as discussed above in connection with FIG. 2; and red signals might also be appropriately connected in such case as is well known in the art.

In connection with the timing operation under control of the contact bank LS3 of FIG. 10, it will be noted that the capacitor 120 serves as the timing capacitor connected between junction 172 and ground, and this capacitor is discharged to reset the timing in connection with the stepping switch stepping out of the particular timed position. This discharge of capacitor 120 to reset the timing is accomplished by shunting the capacitor via the current limiting resistance 198 and the contacts m1—m2, the resistance 198 being connected between the upper side of the capacitor and the contact m1. The contacts m1—m2 are associated with the electromagnet MM which operates a pawl and ratchet mechanism, not shown, to advance the stepping switch from one step to the next. This electromagnet MM is illustrated at the right side of FIG. 10 and is repeated in phantom form in broken lines to the left of the contacts m1—m2 to illustrate its operative association with the latter contacts.

Preferably in well known manner in connection with stepping switches, energization of the electromagnet MM operates a pawl to engage the next tooth of a ratchet wheel, and the actual advancing step from one position to the next occurs upon the return stroke upon deenergization of the electromagnet MM. As the electromagnet MM is energized it attracts its moving contact m1 to engage contact m2 to close the shunt circuit around capacitor 120 described above to discharge this capacitor. This results in the bias of the upper control grid of the coincidence gate CG1 returning to its normal cut-off condition in the absence of coincidence of pulses or timing action. With the upper control grid returned to cutoff bias the coincidence gate CG1 ceases to operate relay R1 and the contacts r11—r12 are opened to release the electromagnet MM, causing the advancing of the stepping switch to the next step and at the same time reopening the shunt around capacitor 120 at the reopened contacts m1—m2.

In the locally timed positions 2, 3, 5 and 6, the capacitor 120 is connected via current limiting resistance or minimum timing resistance 122 to the moving contact W3 associated with the stepping switch bank LS3, to be charged via the respective timing control resistances 276, 277, 278 or 279, in the respective positions 2, 3, 5 and 6; the right hand end of all of these timing resistances, being connected via wire 147 to the direct current positive power.

Since the upper side of capacitor 120 is connected to junction 172, and via wire 171 and resistance 121 to junction 164, and thence to the upper control grid of coincidence gate CG1, when the capacitor 120 is charged sufficiently positive by the charging circuit via one of the timing adjustment resistances as described, this control grid has its bias sufficiently reduced to permit the coincidence gate tube 165 to become conducting, that is to permit substantial plate current to flow, if the lower control grid at 168 is also sufficiently positive.

It will be recalled that this lower control grid at 168 is controlled by the spike pulse output of the pulse former PF2 which is derived from the lower output side of the potentiometer PR7, these spike pulses repeating continuously at the beginning of the positive part of each wave of the reference frequency, or at 400 cycles per second repetition if this frequency is employed for the reference frequency for example.

Thus in the timing positions of the cycle of the stepping switch, as soon as the upper control grid becomes sufficiently positive under control of the timed charging of the capacitor 120, the coincidence gate tube 165 will pass plate current at each spike pulse for each cycle of the reference frequency on the lines FR. The coincidence gate circuit output is sustained to maintain relay R1 energized between successive spike pulses of the successive cycles of the reference frequency, so that substantially as soon as the capacitor 120 becomes charged to overcome the normal grid bias on the upper control grid, the relay R1 is operated by coincidence gate CG1 to operate the electromagnet MM and discharge capacitor 120, the coincidence gate CG1, relay R1 and magnet MM then being released to advance the stepping switch, as previously described. In this connection it will be appreciated that the closing of the contacts m1—m2 is near the end of the energized stroke of the electromagnet MM and its associated pawl and ratchet mechanism and the discharge of capacitor 120 will return the upper control grid of the gate tube 165 to cut-off bias.

FIG. 11 illustrates one embodiment of apparatus according to the feature of the invention relating to automatic homing of one potentiometer into agreement with a remotely selected one of other several other pentiometers, or relating to smooth progressive change from one offset or phase angle relation to another. In FIG. 11 this aspect of the invention is illustrated in enlarged form as compared with FIG. 10, and is also illustrated in partly block diagram form, particularly in connection with the pulse former and coincidence gate parts of the circuit, but the several potentiometers and the associated remote controlled relays and contacts for selectively associating one of the several potentiometers with the input of the pulse former PF3 are shown in detail in schematic circuit form. The various elements of FIG. 11 which are common with FIG. 10 have the same designation in each figure.

At the top of FIG. 11 the offset control lines OC1, OC2 and OC correspond with those of FIG. 3 and FIG. 10 extending from the master controller to one local offset apparatus in FIG. 11, and also extending to the right for connection to other such local offset apparatus at other local control points.

To the left, below the offset control lines are illustrated three horizontal lines designated FR and representing the reference frequency three phase lines from the master controller. These three reference frequency lines are connected in parallel to three points 120 degrees apart on the stators of the several potentiometers PR4, PR5 and PR6, as well as to the corresponding points on the stator of potentiometer PR7. These potentiometers correspond with the similarly designated potentiometers in the upper right hand part of FIG. 10.

The potential divider RS is also shown connected across the outer two of the three phase reference lines FR with its center tap connected to wire 241, and with the associated wire 242 connected to the middle one of the three phase lines FR at the left side of FIG. 11, this potential divider RS and the lines 241 and 242 corresponding to the similarly designated parts of FIG. 10.

The potentiometers PR4, PR5 and PR6 are illustrated with their rotors in different angular positions, the rotors having two contact arms insulated from each other and connected with outer and inner central contact rings, the two arms of each rotor being in contact with the stator at two points 180 degrees apart, and always maintaining this 180 degree relationship, although the rotors may be turned manually into various angular positions to locally preset a desired phase angle or offset relation as one of the several to be selected by remote control from the master controller.

The potentiometer PR7 also has a rotor with two arms insulated from each other 180 degrees apart and connected with inner and outer contact rings, but this rotor in FIG. 11 as in FIG. 10 is connected to be rotated by reversible motor unit RDM, either in a clockwise or counterclockwise direction depending upon the phase relation of the rotor of potentiometer PR7 with respect to the selected one of the potentiometers PR4, PR5 and PR6 or the potential divider RS in connection with any change of offset selection. The rotary drive relation between the motor unit RDM and the rotor of potentiometer PR7 is indicated schematically by the dashed line 251. The reduction gearing G and the motor driving coils CW and CCW of FIG. 10 are not shown separately in FIG. 11 but are assumed to be included in unit RDM.

To the right of potentiometers PR4, PR5 and PR6 in FIG. 11 are shown the relays R4 and R5 and their associated contacts, which correspond with the similarly designated relays and contacts in FIG. 10, except for slight rearrangement of location of the contacts in the drawing, without any circuit change, for convenience of illustration in this particular figure as compared with FIG. 10.

As more fully described above in connection with FIG. 10, the reversible motor unit RDM is controlled by the output relays R2 and R3 of the respective coincidence gates CG2 and CG3, which are in turn controlled by the pulse formers PF2 and PF3, the latter pulse former PF3 being shown subdivided into two blocks designated square pulse shaper PS1 and spike pulse shaper PS2 for convenience of reference. The output of the square pulse shaper PS1 on line 331 controls one of the input lines of the coincidence gate CG3 and the output of the spike pulse shaper PS2 on line 238 controls one of the input lines of the coincidence gate CG2, both of these pulse shapers deriving their input via transformer T3 from one of the potentiometers PR4, PR5 or PR6 or the potential divider RS and its associated return line 242, as selected by the contacts of relays R4 and R5. The connections via these contacts under the several conditions of operation or non-operation of either or both of these relays R4 and R5 has been described above in connection with FIG. 10 and is therefore not repeated here.

The square wave output of pulse shaper PS1 on line 331 corresponds in general with the square wave output on line 226 at PF1 in FIG. 10, or after direct current blocking by capacitors 227 and 231 with the square wave at the right end of resistance 228, for example. A part of the square wave output of pulse shaper PS1 is applied via line 333 to the input of the spike pulse shaper PS2 within the pulse former PF3, the line 333 corresponding in a general way to the line 356 between line 219 and capacitor 220 in pulse former PF3 in FIG. 10.

The pulse former PF2 derives its input from the rotor of potentiometer PR7 via transformer T2, and the output of the pulse former PF2 is connected to the other input line of each of the coincidence gates CG3 and CG2. As previously discussed in connection with FIG. 10 the coincidence gate CG2 with its associated output relay R2 controls the stopping of the motor RDM in coincidence of the rotor of potentiometer PR7 with the rotor of the selected one of the potentiometers PR4, PR5 or PR6 or with the potential divider RS above, and controls the motor line for running the motor via the direction determining contacts r30—r31—r32 when potentiometer PR7 is out of coincidence with the selected potentiometer or potential divider above.

The coincidence gate CG3 with is associated relay R3 controls the direction of rotation of the motor RDM depending upon the coincidence of the spike pulse output of PF2 derived from the rotor of PR7 with the positive square pulse output of the pulse shaper PS1 derived from the rotor of one of potentiometers PR4, PR5, PR6 or potential divider RS and associated line 242, as selected by relays R4 and R5.

If the spike pulse output of pulse former PF2 is in coincidence with the positive square pulse output of the pulse shaper PS1 corresponding to the positive half of the cycle of the periodic wave energy on the reference frequency lines as phase displaced by the selected one of the several units PR4, PR5, PR6 or RS, then coincidence gate CG3 is operated and relay R3 is energized to connect the motor unit RDM to turn the rotor of PR7 in the counterclockwise direction, whereas if the spike pulse output of pulse former PF2 is not in coincidence with the positive square pulse output of pulse shaper PS1 then the coincidence gate CG3 is not operated and the relay R3 is deenergized to connect the motor unit RDM for clockwise rotation of the rotor of PR7, in each case until the rotor of potentiometer PR7 has been turned to the newly selected position at which point the coincidence gate CG2 will be operated to open the motor driving circuit by relay R2, the circuits being the same as described above in FIG. 10.

It will be noted in FIG. 11 that the condition of coincidence is illustrated corresponding to the pulse relations of FIG. 7 for example, with coincidence gate CG2 and its associated relay R2 operated to open the operating circuit of the motor of the unit RDM so that the rotor of potentiometer PR7 is illustrated in its resting condition. The released condition of relay R3 is also illustrated in FIG. 11 with coincidence gate CG3 not operated, assuming as in FIG. 10 that the rotor of potentiometer PR7 has arrived at its resting condition by having been driven in the clockwise direction.

It will also be noted in FIG. 11 that the rotor of potentiometer PR7 is illustrated in a horizontal position with its right hand arm 367 at the mid-point of the 120 degree section of its stator connected between wires 353 and 351, which corresponds to the connection of wire 241 at the mid-point of the potential divider RS connected across wires 353 and 351 and the outer two of the reference frequency lines FR. The left hand arm of the rotor of potentiometer PR7 is illustrated as in contact with the 120 degree tapping point at the left side of the stator of potentiometer PR7 connected via wire 352 to the middle one of the three reference frequency lines FR. Thus the connection of the left hand arm of the rotor of PR7 as illustrated is the same as the wire 242 above the potential divider RS and serving as a return line associated with this potential divider.

Since the wire 241 connects potential divider RS via contacts r40—r41 and contacts r50—r51 to the wire 334 at the upper side of transformer T3 associated with pulse former PF3, and the wire 242 is connected via contacts r410—r49, r54—r55 and wire 335 to the lower side of transformer T3, with the relays R4 and R5 deenergized as illustrated, and since the right hand arm 367 of the rotor of potentiometer PR7 is connected via wire 234 to the upper side of transformer T2 and the left hand arm is connected via wire 235 to the lower side of T2 associated to the pulse former PF2, it will be noted that in the condition illustrated the wave energies derived from the rotor of PR7 and from potential divider RS in association with its return line 242 will be in coincidence.

It will be noted further in FIG. 11 that the rotor of potentiometer PR4 is illustrated with its right hand arm 364, associated with the inner contact ring and line 342, has an angle and a corresponding phase lag in a clockwise direction with relation to the corresponding arm 367 of potentiometer PR7. It will also be noted that the corresponding arms 365 and 366 of potentiometers PR5 and PR6 are illustrated in FIG. 11 as having an angle leading that of PR7, considered in the clockwise direction, the arm of PR6 being vertical upward and the arm of PR5 being at an angle between PR6 and PR7 for example. This arrangement shown of the arms 364, 365, 366 and 367 of potentiometers PR4, PR5 and PR7 is for illustrative purposes and not in any limiting sense, it will be understood that the rotor arms of potentiometers PR4, PR5 and PR6 may be turned manually for any desired angle and corresponding phase relation to the reference frequency wave energy.

It will be appreciated that various forms of traffic signal cycles may be employed in connection with the invention and reference may be made to my prior U.S. Patents 2,100,831 and 2,127,080 for examples of some forms of such signal cycles and associated signal connections.

Also it will be appreciated by those skilled in the art in view of the teachings of the invention that other forms of polyphase periodic electrical energy and methods of obtaining the same may be employed to obtain the distributed energy in relation to phase angle, as applied to the 360 degree potentiometer stators for example, from which the desired output periodic electrical energy in desired phase relation can be obtained for phase coincidence comparison.

It will be further understood that the periodic wave energy derived in adjustable phase relation to one of the original wave energies, while usually actually displaced in phase, may in some circumstances when desired be adjusted to zero phase displacement, and in that sense the term phase displaced wave energy and the like may include zero phase displaced wave energy as one aspect of adjustment where applicable.

It will also be appreciated that various further modifications or rearrangements of the illustrated embodiments of the invention or in parts thereof may be made without departing from the spirit of the invention within the scope of the appended claims.

I claim:

1. In a traffic control system having two electrical periodic wave energies of slightly differing frequencies such that one of said energies has a slow progressive phase shift with respect to the other of said periodic wave energies at a controlled rate to provide phase coincidence at predetermined time intervals of the order of a desired traffic signal control cycle, a signal controller including means for receiving each of said energies, coincidence detecting means for detecting the times of phase coincidence of said received energies, and means for actuating a traffic signal control circuit in response to detection of phase coincidence by said coincidence detecting means.

2. In a traffic control system having two electrical periodic wave energies of slightly differing frequencies such that one of said energies has a slow progressive phase shift with respect to the other of said periodic wave energies at a controlled rate to provide phase coincidence at predetermined time intervals of the order of a desired traffic signal control cycle, a signal controller including means for receiving each of said energies, phase control means for adjusting the phase of at least one of said received energies, coincidence detecting means for detecting the times of phase coincidence of the resulting received energies, and means for actuating a traffic signal control circuit cyclically in desired time relation to said predetermined time intervals as determined by said phase adjustment and in response to said coincidence detecting means as a result of said phase coincidence.

3. In a traffic control system having two polyphase electrical wave energies of slightly differing frequencies such that one of said energies has a slow progressive phase shift with respect to the other of said periodic wave energies at a rate to provide phase coincidence at predetermined time intervals, a signal controller including means for receiving each of said energies and for producing single phase energies of the same period and in desired phase relation to the respective said polyphase energies, coincidence detecting means for receiving said single phase energies and for determining the times of phase coincidence of said single phase energies, and means for actuating a traffic control circuit by said coincidence detecting means as a result of said phase coincidence.

4. In a traffic control system having two polyphase electrical wave energies of slightly differing frequencies such that one of said energies has a slow progressive phase shift with respect to the other of said periodic wave energies at a rate to provide phase coincidence at predetermined time intervals, a signal controller including means for receiving each of said energies and for producing single phase energies functionally related to the respective said polyphase energies, at least one of said receiving means including means for adjusting the phase of its respective single phase output energy, coincidence detecting means for receiving said single phase energies and for determining the time of phase coincidence of said single phase energies, and means for actuating a traffic signal control circuit by said coincidence detecting means as a result of said phase coincidence.

5. A traffic control system including means for generating two polyphase electrical wave energies of slightly differing frequencies such that one of said energies has a slow progressive phase shift with respect to the other of said periodic wave energies at a rate to provide phase coincidence at predetermined time intervals, means for varying the frequency of at least one of said generated energies relative to the other to vary said time intervals, means for receiving each of said energies and for producing single phase energies functionally related to the respective said polyphase energies, coincidence detecting means for receiving said single phase energies and for determining the times of phase coincidence of said single phase energies, and a traffic control circuit actuated by said coincidence detecting means as a result of said phase coincidence.

6. A traffic control system including means for generating two polyphase electrical wave energies of slightly differing frequencies such that one of said energies has a slow progressive phase shift with respect to the other of said periodic wave energies at a rate to provide phase coincidence at predetermined time intervals, means for receiving each of said energies and for producing single phase output energies functionally related to the respective said polyphase energies, at least one of said receiving means including a plurality of individually operable means for adjusting the phase of its respective single phase output energy, coincidence detection means for receiving said resulting single phase energies and for determining the times of phase coincidence of said single phase energies, a traffic control circuit actuated by said coincidence detecting means as a result of said phase coincidence, and remotely controllable selection means for determining which of said phase adjusting means shall operate at a given time.

7. A traffic control system including means for generating two polyphase electrical wave energies of slightly differing frequencies such that one of said energies has a slow progressive phase shift with respect to the other of said periodic wave energies at a rate to provide phase coincidence at predetermined time intervals, means for receiving each of said energies and for producing single phase energies functionally related to the respective said polyphase energies, at least one of said receiving means including a plurality of individually operable means for adjusting the phase of its respective single phase output energy, coincidence detecting means for receiving said resulting single phase energies and for determining the times of phase coincidence of said single phase energies, and a traffic control circuit actuated by said coincidence detecting means as a result of said phase coincidence, and remotely controllable selection means for determining which of said phase adjusting means shall operate at a given time adapted to shift in the shortest time phase direction from one remotely selected phase adjusting means to another at the time of shifting.

8. In a traffic signal controller having a signal timing cycle controlled by two polyphase electrical energies of slightly differing frequencies, means for converting the first of said energies into a first single phase energy of predetermined phase displacement relative to said first polyphase energy, a plurality of cycle control circuits, each of said cycle control circuits including a plurality of sequentially operable conversion means for converting the second polyphase energy into a plurality of second single phase energies of different phase displacements relative to said second polyphase energy, remotely controllable selection means for determining which of said cycle control circuits shall operate at a given time, coincidence detecting means for receiving said first single phase energy from said first conversion means and said second single phase energy from said operable second conversion means and for producing an electrical output when said first and second single phase energies are in phase coincidence, means controlled by said electrical output for sequentially selecting the operable second conversion means, and switch means controlled by said electrical output for controlling said traffic signal.

9. In a traffic signal controller having a signal timing cycle controlled by two polyphase electrical energies of slightly differing frequencies, means for converting the first of said energies into a first single phase energy of predetermined phase displacement relative to said first polyphase energy, a plurality of sequentially operable conversion means for converting said second polyphase energy into a plurality of second single phase energies of different phase relative to said second polyphase energy, coincidence detecting means for receiving said first single phase energy from said first conversion means and said second single phase energy from said operable second conversion means and for producing an electrical output when said first and second single phase energies are in phase coincidence, step-by-step switching means controlled by said electrical output for sequentially selecting the operable second conversion means, a timing circuit operated in selected steps of said step-by-step means to actuate said step-by-step means during part of said sequence between actuations by phase coincidence of said single phase energies, and switch means controlled by said electrical output for controlling said traffic signal.

10. In a traffic control system having two electrical periodic wave energies of slightly differing frequencies such that one of said energies has a slow progressive phase shift with respect to the other of said periodic wave energies at a rate to provide phase coincidence at predetermined time intervals, a signal controller including means for receiving each of said energies, pulse producing means capable of receiving said energies and of producing an output pulse functionally related to the period of one of said energies and an output pulse functionally related to the period of the other of said energies, coincidence gate circuit means for detecting the times of phase coincidence of said pulses, said coincidence gate circuit means including a coincidence gate tube having an anode-cathode circuit having its conductivity controlled by conjoint action of two control grids, connected to be controlled by the respective two pulses to render said anode-cathode conducting to provide an electrical output when said output pulses are in phase coincidence with each other, and means controlled by the output of said coincidence gate circuit means for actuating a traffic signal control circuit.

11. In a traffic control system having two three phase electrical wave energies of slightly differing frequencies such that one of said energies has a slow progressive phase shift with respect to the other of said periodic wave energies at a rate to provide phase coincidence at predetermined time intervals, a signal controller including means for receiving each of said energies and for producing single phase energies functionally related to the respective said three phase energies, at least one of said receiving means including means for adjusting the phase of its respective single phase output energy, said adjustable receiving means including a delta-connected resistance circuit to receive its respective three phase energy and a pair of contacts variable together to tap said resistance circuit at two different points to derive such phase adjusted single phase energy therefrom, coincidence detecting means for receiving said single phase energies and for determining the time of phase coincidence of said single phase energies, and means for actuating a traffic signal control circuit by said coincidence detecting means as a result of said phase coincidence.

12. A control system including means for generating two three phase electrical wave energies of slightly differing frequencies such that one of said energies has a slow progressive phase shift with respect to the other of said periodic wave energies at a rate to provide phase coincidence at predetermined time intervals, means for receiving each of said energies and for producing single phase energies functionally related to the respective said three phase energies, at least one of said receiving means including a plurality of individually operable means for adjusting the phase of its respective single phase output energy, said individually operable means including delta-connected resistance circuits to receive the respective three phase energies and pairs of variable contacts adapted to tap said resistance circuits at two different points, coincidence detecting means for receiving said resulting single phase energies and for determining the times of phase coincidence of said single phase energies, and an output control circuit actuated by said coincidence detecting means as a result of said phase coincidence, and remotely-controllable selection means for determining which of said phase adjusting means shall operate at a given time.

13. A remote control cycle timing circuit for receiving from a remote source two three phase electrical energies of slightly differing frequencies such that one of said energies has a slow progressive phase shift with respect to the other of said energies, said circuit including a first conversion means for receiving the first of said energies and converting it into a single phase energy functionally related to said first energy, a second conversion means for receiving the second of said energies, said second means including a plurality of sequentially operable conversion means for converting said second energy into a single phase energy functionally related to said second energy, each of said said means in said second conversion means including a delta-connected resistance circuit to receive three phase energy and a pair of variable contacts adapted to tap said resistance circuit at two different points to obtain single phase energy therefrom in desired phase relation to the received three phase energy, coincidence detecting means for receiving said single phase energies for determining the times of phase coincidence of said phase energies and for producing an electrical output at said times of phase coincidence, and switching means associated with said sequentially operable conversion means and controlled by said electrical output for sequentially determining which of said latter named means is operable at a given time.

14. A traffic signal controller adapted to be controlled by two electrical periodic wave energies, one of which is shifting slowly and progressively in phase with respect to the other at a variable rate to provide phase coincidence at variable time intervals of the order of a desired signal time cycle, said controller including in combination means for deriving further electrical periodic wave energy from at least one of said first mentioned wave energies and of the same period but in adjustable phase relation thereto, output circuit means for controlling a traffic signal, and means for controlling said output circuit means in response to phase coincidence of said further electrical wave energy and the other of said first mentioned wave energies.

15. A traffic signal controller adapted to be controlled by two electrical periodic wave energies, one of which is shifting slowly and progressively in phase with respect to the other at a variable rate to provide phase coincidence at variable time intervals of the order of a desired traffic signal time cycle, said controller including in combination means for deriving a plurality of further electrical periodic wave energies of the same period as at least one of said first mentioned wave energies and in individually adjustable different phase relations thereto, a plurality of output circuit means for controlling a traffic signal in its time cycle, and means for controlling said output circuit means in sequence in response to successive phase coincidences of the respective further wave energies with the other of said first mentioned wave energies.

16. A traffic signal controller adapted to be controlled by two electrical periodic wave energies, one of which is shifting slowly and progressively in phase with respect to the other at a variable rate to provide phase coincidence at variable time intervals of the order of a desired traffic signal time cycle, said controller including in combination means for deriving a plurality of further electrical periodic wave energies of the same period as at least one of said first mentioned wave energies and in individually adjustable different phase relations thereto, means for deriving an additional electrical periodic wave energy from the other of said first mentioned wave energies and of the same period but in adjustable phase relation thereto, a plurality of output circuit means for controlling a traffic signal in its time cycle, and means for controlling said output circuit means in sequence in response to successive phase coincidences of said additional wave energy with the respective said further wave energies.

17. A traffic signal controller adapted to be controlled by two electrical periodic wave energies, one of which is shifting slowly and progressively in phase with respect to the other at a variable rate to provide phase coincidence at variable time intervals of the order of a desired traffic signal time cycle, said controller including in combination means for deriving a plurality of further electrical periodic wave energies of the same period as at least one of said first mentioned wave energies and in individually adjustable different phase relations thereto, means for deriving an additional electrical periodic wave energy from the other of said first mentioned wave energies and of the same period but in adjustable phase relation thereto, a plurality of output circuit means for controlling a traffic signal in its time cycle, and means operable for controlling said output circuit means in a series of steps to provide such time cycle of control of the traffic signal, and coincidence responsive means for operating said cyclic switch from one step to another in response to coincidence of wave energies applied thereto, means for applying said additional wave energy to said sequence responsive means through such time cycle, and means controlled by said cyclic switch means for selectively applying said further wave energies one at a time to said coincidence responsive means in succession in selected steps progressively through such time cycle.

18. A traffic signal controller adapted to be controlled by two electrical periodic wave energies, one of which is shifting slowly and progressively in phase with respect to the other at a variable rate to provide phase coincidence at variable time intervals of the order of a desired traffic signal time cycle, said controller including in combination means for deriving a plurality of further electrical periodic wave energies of the same period as at least one of said first mentioned wave energies and in individually adjustable different phase relations thereto, means for deriving a plurality of additional electrical periodic wave energies from the other of said first mentioned wave energies and of the same period but in individually adjustable different phase relation thereto, phase coincidence responsive means for providing an output in response to phase coincidence of two wave energies applied thereto, a plurality of output circuit means for controlling a traffic signal in its time cycle, means for controlling said output circuit means in desired succession in such time cycle in response to successive such outputs from said coincidence responsive means, means for applying said further wave energies in desired succession relation one at a time to said coincidence responsive means in such time cycle, and means for selectively applying one of said additional wave energies at a time to said coincidence responsive means for phase comparison with a series of successive said further wave energies to provide selective phase displacement of such series as a group.

19. A traffic signal controller adapted to be controlled by two electrical periodic wave energies, one of which is shifting slowly and progressively in phase with respect to the other at a variable rate to provide phase coincidence at variable time intervals of the order of a desired traffic signal time cycle, said controller including in combination means for deriving a plurality of further electrical periodic wave energies of the same period as at least one of said first mentioned wave energies and in individually adjustable different phase relations thereto, means for deriving a plurality of additional electrical periodic wave energies from the other of said first mentioned wave energies and of the same period but in individually adjustable different phase relation thereto, phase coincidence responsive means for providing an output in response to phase coincidence of two wave energies applied thereto, a plurality of output circuit means for controlling a traffic signal in its time cycle, means for controlling said output circuit means in desired succession in such time cycle in response to successive such outputs from said coincidence responsive means, means for applying said further wave energies in desired succession relation one at a time to said coincidence responsive means in such time cycle, means for selecting any desired one of said additional wave energies, means for deriving a further additional periodic wave energy from said other first mentioned wave energy and of the same period but in adjustable phase relation thereto, means for automatically gradually adjusting said further additional energy to phase coincidence with the selected additional wave energy from the previously selected additional wave energy at any change of such selection, and means for applying said further additional wave energy to said coincidence responsive means for phase comparison with successive said further wave energies over such time cycle.

20. In a master-local control system for operating a plurality of local traffic signal controllers in time cycles having a common total length variable by a master controller with individual adjustment of distribution of the time cycle over a sequence of signal indications and individual adjustment of offset of such cycle of signal indications at the respective local controllers, means at the master controller for generating two electrical periodic wave energies, one of which is shifting slowly and progressively in phase with respect to the other at an adjustable time rate to provide phase coincidence at adjustably predetermined time intervals of the order of the common total traffic signal time cycle, means for transmiting said two wave energies in common to said local controllers, each local controller including means for deriving from one of said transmitted wave energies a first local periodic wave energy of the same period as the last named one transmitted wave energy but in adjustable phase relation thereto, a plurality of means for deriving a plurality of further locally derived periodic wave energies from the other of said transmitted wave energies of the same period as the latter but in individually adjustable different phase relations thereto, means for providing an electrical output in response to coincidence of two electrical energies at its input, cyclic switch means controlled step-by-step in its cycle at selected positions thereof by said output of said coincidence responsive means, and means for applying said first locally derived energy and said further plurality of locally derived energies in sequence to the input of said coincidence responsive means in selected positions of said cyclic switch for control of said cyclic switch means in response to phase coincidence of said first locally derived energy with said further plurality of locally derived energies in sequence, and traffic signal control circuits controlled by said cyclic switch means in selected positions thereof, whereby said phase coincidences provide locally adjusted predetermined percentage points in the local time cycle controlled proportionately in time spacing by control of the cycle length by such time rate adjustment at the master controller.

21. In a traffic signal control system, master timing means having a predetermined time cycle, a local signal controller remotely located and having a traffic signal control cycle for a sequence of signal indications, a plurality of locally adjusted and remotely selected alternate means for normally synchronizing said local cycle in alternate different phase offset relations to said master predetermined time cycle, and means for synchronizing the local time cycle in gradually shifting phase offset in the nearest phase direction from one selected phase offset relation to a different selected phase offset relation.

22. A combination as in claim 21, and said last named means including means for distributing said gradual offset shift over more than one signal control cycle and in substantially even proportion over several signal indications of said signal control cycle.

23. A combination as in claim 21, and in which said last named means includes a reversible rotary element and means for gradually rotating said element in one direction or the opposite direction respectively for so changing from one said selected offset to another by increasing or decreasing said local signal time cycle by a small fraction thereof respectively during the transition between offsets in accordance with whether the newly selected said other offset is of later phase or earlier phase than the said one selected offset respectively.

24. A combination as in claim 21, and in which said traffic signal cycle includes go signal periods in different parts of said cycle for control of different traffic movements, and in which said last named means includes a reversible rotary element and means for gradually rotating said element in one direction or the opposite direction respectively for so changing from one selected offset to another by increasing or decreasing said go periods of said cycle by a small fraction thereof respectively during the transition between offsets in accordance with whether the newly selected said other offset is of later phase or earlier phase than the said one selected offset respectively.

25. A combination as in claim 21 which further includes remote means for selection of one of said plurality of alternate means and in which said means for synchronizing the local time cycle in gradually shifting offset in the nearest direction between offsets is responsive to a change in such remote selection.

26. A remote control cycle timing system including means for generating two polyphase electrical energies, adjustable means for varying the frequency of one of said energies relative to the other to provide a variable slow rate of progressive phase shift between said energies to obtain phase coincidence thereof at predetermined time intervals, means for transmitting said energies, and receiving means for receiving said transmitted energies, said receiving means including means for producing two single phase electrical energies functionally related to said two polyphase electrical energies, means for determining the times of phase coincidence of said single phase energies, and means for producing an output electrical signal at said times of phase coincidence.

27. A remote control cycle timing circuit for receiving two polyphase electrical energies of slightly differing frequencies such that one of said energies has a slow progressive phase shift with respect to the other of said energies, said circuit including a first conversion means for receiving the first of said energies and converting it into a single phase energy functionally related to said first energy, a second means for receiving the second of said energies, and including a plurality of sequentially operable conversion means for converting said second energy into a single phase energy functionally related to said second energy and each of said latter means being phase adjustable, coincidence detecting means for receiving said single phase energies and for producing an electrical output at the time of phase coincidence of said single phase energies, and switching means associated with said sequentially operable conversion means and controlled by said electrical output for sequentially determining which of said latter means is operable at a given time.

28. In combination, means for generating two electrical periodic wave energies, one of which is slowly shifting in phase with respect to the other at a rate to provide phase coincidences at predetermined time intervals, means for deriving a further periodic wave energy of the same period as one of said periodic wave energies and in adjustable phase relation thereto, and means for generating an electrical output in response to coincidence of said further wave energy with the other of said first mentioned wave energies.

29. In combination, means for generating two electrical periodic wave energies, one of which is slowly shifting in phase with respect to the other at a rate to provide phase coincidences at predetermined time intervals, output circuit means, a multi-position cyclic switch means for controlling said output circuit means in a cycle of sequential positions, coincidence response means for operating said cyclic switch means from one position to another in its cycle in response to coincidence of wave energies applied thereto, and means controlled by said cyclic switch means for selectively applying said wave energies to said coincidence response means in at least one position of the cycle of said cyclic switch means for so operating said cyclic switch means and for dissociating at least one of said wave energies from said coincidence response means in at least one other position of the cycle of said cyclic switch means, timing means for controlling said cyclic switch means when made effective therefor, and further means controlled by said cyclic switch means for selectively making said timing means so effective in at least said one other position of the cycle of said cyclic switch means.

30. A combination as in claim 29 and in which said coincidence response means includes a coincidence gate circuit for response to coincidence of two inputs and having one of its inputs controlled by one of said wave energies in both said one and said other positions and having its other input controlled by the other of said wave energies in said one cycle position and said timing means includes means for controlling the said other input of said coincidence gate circuit in said other position for so controlling said cyclic switch means.

31. In combination, means for generating two electrical periodic wave energies, one of which is slowly shifting in phase with respect to the other at a rate to provide phase coincidences at predetermined time intervals, output circuit means, a multi-position cyclic switch means for controlling said output circuit means in a cycle of sequential positions, coincidence response means for operating said cyclic switch means from one positon to another in its cycle in response to coincidence of wave energies applied thereto, and means controlled by said cyclic switch means for selectively applying said wave energies to said coincidence response means in at least one position of the cycle of said cyclic switch means for so operating said cyclic switch means and for dissociating at least one of said wave energies from said coincidence response means in at least one other position of the cycle of said cyclic switch means and timing means for controlling said cyclic switch means when made effective therefor, and further means controlled by said cyclic switch means for selectively making said timing means so effective in at least said one other position of the cycle of said cyclic switch means, means forming a part of said first generating means to vary the rate of phase shift to vary the time between phase coincidences of the first mentioned two wave energies and thus to vary the time length of the cycle of said cyclic switch means, and one of said output circuit means overlapping two cyclic switch positions including one position controlled by such phase coincidence responsive means and the other position controlled by said timing means for controlling the total time period of said one output circuit means by a combination of predetermined timing in part and variably spaced coincidence in part.

32. In combination, means for generating a three phase electrical periodic wave energy of one frequency, means for deriving from said wave energy a second three phase electrical periodic wave energy having a slight frequency difference therefrom to provide a slow progressive phase shift of the second wave energy with respect to the first mentioned wave energy, a potentiometer having a 360 degree continuous impedance stator with a plurality of evenly spaced taps thereon connected to the said first wave energy output of said generating means to distribute such output substantially evenly over said stator, said potentiometer having a rotor having two contact arms adjustable to any angular position with respect to said stator while maintaining 180 degrees spacing of said arms with respect to each other with the said arms in contact with corresponding spaced points on said stator, a similar potentiometer having its stator connected to said second wave energy from the output of said second wave energy deriving means and having a rotor associated with its stator in any desired angular contact position with respect thereto, spike pulse forming means having its input connected to the respective arms of the rotor of said first potentiometer to derive from the single phase output of the said rotor in adjustable phase relation to said first three phase wave energy in accordance with the angular position of said rotor on its associated stator for providing a narrow spike output pulse at a predetermined point on each wave of said first single phase wave energy derived from said first power phase wave energy, a second pulse former having its input connected to the single phase output of the rotor of said second potentiometer derived from said second wave energy and in adjustable phase relation thereto in accordance with the angular position of its rotor with respect to its associated stator providing a second narrow spike pulse output at a corresponding predetermined point on each wave of said second single phase wave energy, a coincidence gate circuit providing an output distinguishing between coincidence and noncoincidence of pulses applied to its input, said coincidence gate having the spike pulse outputs of said first and second pulse formers connected to its input, and an output circuit differently controlled by said coincidence gate circuit in response to coincidence and noncoincidence respectively of said spike pulses at its input.

33. A combination as in claim 32 and including means for adjusting the frequency difference between said first and second three phase wave energies.

34. A combination as in claim 32 and including a multi-position cyclic switch means having a cycle of positions through which it is adapted to be operated and controlled by the output circuit from said coincidence gate circuit to be operated from one position to another in its cycle in response to coincidence indicating output of said coincidence, and further output circuit means controlled by said cyclic switch means in its cycle of positions.

35. In combination, means for generating a three phase electrical periodic wave energy of one frequency, means for deriving from said wave energy a second three phase electrical periodic wave energy having a slight frequency difference therefrom to provide a slow progressive phase shift of the second wave energy with respect to the first mentioned wave energy, a potentiometer having a 360 degree continuous impedance stator with a plurality of evenly spaced taps thereon connected to the said first wave energy output of said generating means to distribute such output substantially evenly over said stator, said potentiometer having a rotor having two contact arms adjustable to any angular position with respect to said stator while maintaining 180 degrees spacing of said arms with respect to each other with the said arms in contact with corresponding spaced points on said stator, a plurality of additional similar potentiometers having individually adjustable rotors and with their stators connected in parallel to said second wave energy for providing differently phase displaced single phase wave energy outputs from said rotors, spike pulse forming means having its input connected to the respective arms of the rotor of said first potentiometer to derive from the single phase output of the said rotor in adjustable phase relation to said first three phase wave energy in accordance with the angular position of said rotor on its associated stator for providing a narrow spike output pulse at a predetermined point on each wave of said first single phase wave energy derived from said first power phase wave energy, a second pulse former having its input connected to the single phase output of the rotor of said second potentiometer derived from said second wave energy and in adjustable phase relation thereto in accordance with the angular position of its rotor with respect to its associated stator providing a second narrow spike pulse output at a corresponding predetermined point on each wave of said second single phase wave energy, a coincidence gate circuit providing an output distinguishing between coincidence and noncoincidence of pulses applied to its input, said coincidence gate have the spike pulse outputs of said first and second pulse formers connected to its input, and an output circuit differently controlled by said coincidence gate circuit in response to coincidence and noncoincidence respectively of said spike pulses at its input, a multi-position cyclic switch means having a cycle of positions through which it is adapted to be operated and controlled by the output circuit from said coincidence gate circuit to be operated from one position to another in its cycle in response to coincidence indicating output of said coincidence, and further output circuit means controlled by said cyclic switch means in its cycle of positions, and additional output circuit means of said cyclic switch for selectively connecting the single phase output of the rotors of the respective additional plurality of potentiometers one at a time to the input of its associated pulse former in selected positions of said cyclic switch for control of the latter in said selected positions.

36. In a controller adapted to be controlled by two electrical periodic wave energies, one of which is slowly and progressively shifting in phase with respect to another at a rate to provide phase coincidence at predetermined desired time intervals, a plurality of similar potentiometers having individual 360 degree stators connected in parallel for connection of one of the first mentioned wave energies thereto to provide a phase angle distribution of said connected wave energy substantially uniformly over each of the associated stators, the several potentiometers having individual rotors in adjustable angular position with respect to the associated respective stators but with each rotor having contact arms for contact at all times with its associated stator at points uniformly spaced apart with respect to each other to provide wave energy outputs from the respective potentiometers in individual adjustable predetermined phase relation to said one of said first mentioned wave energies in accordance with such angular position, a similar additional potentiometer having its stator connected in parallel with the stators of said plurality of potentiometers for connection to said one of said first mentioned wave energies and having a further wave energy output from its rotor in predetermined phase relation to said one of said first mentioned wave energies in accordance with the angular position of its rotor with respect to its stator, driving means for rotating the rotor of said additional potentiometer when actuated, driving control means for operating in response to noncoincidence of phase of the wave energy outputs of the rotor of said additional potentiometer and of the rotor of the selected one of said plurality of potentiometers to actuate said driving means to rotate the rotor of said additional potentiometer to bring its output into phase coincidence with the output of said selected potentiometer, means for deriving an additional wave energy output in adjustable phase relation to the other of the first two mentioned wave energies, and means for providing an output in response to phase coincidence of the last named additional wave energy output with the wave energy of the rotor of said additional potentiometer, and selective control means for selecting one at a time of said plurality of potentiometers for such phase comparison of its output with the output of said additional potentiometer by said driving control means.

37. In a controller adapted to be controlled by two electrical periodic wave energies, one of which is slowly and progressively shifting in phase with respect to another at a rate to provide phase coincidence at predetermined desired time intervals, a plurality of similar potentiometers having individual 360 degree stators connected in parallel for connection of one of the first mentioned wave energies thereto to provide a phase angle distribution of said connected wave energy substantially uniformly over each of the associated stators, the several potentiometers having individual rotors in adjustable angular position with respect to the associated respective stators but with each rotor having contact arms for contact at all times with its associated stator at points uniformly spaced apart with respect to each other to provide wave energy ouputs from the respective potentiometers in individual adjustable predetermined phase relation to said one of said first mentioned wave energies in accordance with such angular position, a similar additional potentiometer having its stator connected in parallel with the stators of said plurality of potentiometers for connection to said one of said first mentioned wave energies and having a further wave energy output from its rotor in predetermined phase relation to said one of said first mentioned wave energies in accordance with the angular position of its rotor with respect to its stator, driving means for rotating the rotor of said additional potentiometer when actuated, driving control means for operating in response to noncoincidence of phase of the wave energy outputs of the rotor of said additional potentiometer and of the rotor of the selected one of said plurality of potentiometers to actuate said driving means to rotate the rotor of said additional potentiometer to bring its output into phase coincidence with the output of said selected potentiometer, means for deriving an additional wave energy output in adjustable phase relation to the other of the first two mentioned wave energies, and means for providing an output in response to phase coincidence of the last named additional wave energy output with the wave energy of the rotor of said additional potentiometer, and selective control means for selecting one at a time of said plurality of potentiometers for such phase comparison of its output with the output of said additional potentiometer by said driving control means, a multiposition sequential cyclic traffic signal controller, means for operating a said signal controller from one position in its cycle to another in response to coincidence output of the last named coincidence responsive means, said additional wave energy deriving means including a plurality of potentiometers similar to said first mentioned plurality of potentiometers but having their stators associated in parallel with the second of the first mentioned two wave energies, and means forming a part of said signal controller for selectively associating one at a time of said further plurality of potentiometers with said last named phase coincidence responsive means in selected positions of the cycle of said signal controller for control of the operation of said controller from such selected positions, whereby the phase offset of the signal sequence cycle is controlled by said additional potentiometer in association with the selected one of said first plurality of potentiometers with respect to the first of said first mentioned wave energies and the distribution of the signal cycle over the several selected positions of the signal controller is controlled by the several further plurality of potentiometers respectively.

38. In a controller adapted to be controlled by electrical periodic wave energy, a plurality of similar potentiometers having individual 360 degree stators connected in parallel for connection of the first mentioned wave energy thereto to provide a phase angle distribution of said connected wave energy substantially uniformly over each of the associated stators, the several potentiometers having individual rotors of adjustable angular position with respect to the associated respective stators but with each rotor having two contact arms for contact at all times with its associated stator while maintaining said two contact arms of each stator always uniformly spaced apart with respect to each other, to provide wave energy outputs from the respective potentiometers in individually adjustable predetermined phase relation to said first mentioned wave energy in accordance with angular position, a similar additional potentiometer having its stator connected in parallel with the stators of said plurality of potentiometers for connection to said first mentioned wave energy and having a further wave energy output from its rotor in predetermined phase relation to said first mentioned wave energy in accordance with the angular position of its rotor with respect to its stator, driving means for rotating the rotor of said additional potentiometer when actuated, and driving control means for operating in response to noncoincidence of phase of the wave energy output of the rotor of said additional potentiometer with the wave energy output of the rotor of a selected one of said plurality of potentiometers to actuate said driving means to rotate the rotor of said additional potentiometer to bring its output into phase coincidence with the output of said selected potentiometer, and selective control means for selecting one at a time of said plurality of potentiometers for such phase comparison of its output with the output of said additional potentiometer by said driving control means.

39. In a controller adapted to be controlled by electrical periodic wave energy, a potentiometer having a 360 degree stator for connection of said wave energy thereto to provide a phase angle distribution of said connected wave energy substantially uniformly over said stator and said potentiometer having a rotor of adjustable angular position with respect to said stator said rotor having two contact arms for contact at all times with said stator at points uniformly spaced apart with respect to each other to provide periodic wave energy output in adjustable predetermined phase relation to said first mentioned wave energy in accordance with such angular position, a similar potentiometer having its stator connected in parallel with the stator of the first mentioned potentiometer for connection to said first mentioned wave energy and having a further wave energy output from its rotor in predetermined phase relation to said first mentioned wave energy in accordance with the angular position of its rotor with respect to its stator, driving means for rotating the rotor of said additional potentiometer when actuated, and driving control means for operating in response to noncoincidence of phase of the wave energy outputs of the respective rotors to actuate said driving means to rotate the rotor of said additional potentiometer to bring the respective wave energy outputs of the respective rotors into phase coincidence.

40. A method of remote cyclic signaling at a plurality of points in desired time spaced relationship comprising generating at one point two electrical periodic wave energies of slightly differing frequencies such that one of said wave energies has a slow progressive phase shift with respect to the other at an adjustable time rate to provide phase coincidence at adjustable predetermined time intervals once per desired time cycle, transmitting said wave energies to a plurality of remote points, receiving said wave energies at such remote points, deriving from at least one of said received energies at such plurality of remote points, further electrical periodic wave energies of the same period as said one of the received wave energies but in differently adjustable phase relation thereto, producing at each of such plurality of remote points an electrical output in response to each of the phase coincidences of the last mentioned derived wave energy at such point with respect to the other wave energy received at such point, and producing signaling changes at the respective plurality of remote points in response to the respective electrical outputs, the signaling change at each one point being in response to the electrical output at such one point alone.

41. A method of cyclic signaling comprising producing two electrical periodic wave energies of slightly differing frequencies such that one of said energies has a slow progressive phase shift with respect to the other at a variable time rate to provide phase coincidence at variable time intervals cyclically, producing a brief electrical pulse at a desired point in the periodic cycle of one of said wave energies, producing a further brief pulse in desired phase relation to a corresponding point in the periodic cycle of the other of said wave energies, said pulses having lengths of a small fraction of the respective periodic cycles and repeated periodically in said periodic cycles, producing an electrical output in response to coincidence of said pulses with said further pulses in said periodic cycles, and producing a signaling change in response to such output to provide a signaling time cycle variable in accordance with the variable time spacing of the first mentioned cyclic coincidences and of desired phase relation to said first mentioned cyclic coincidences.

42. In a system for remote control of a traffic signal cycle, a cyclic controller having a cycle of operation for a sequence of signal indications, means including a plurality of remotely selectable elements individually adjustable in angular position for determining desired alternative offset relations for synchronizing the cycle of said cyclic controller with a remotely controlled time cycle in different time phase relations to the latter cycle, and means including a reversible rotary element and control means associated therewith for synchronizing said cycle of operation normally in the offset relation determined by the selected adjustable element in absence of recent change of selection of the latter and for synchronizing said cycle of operation in gradually changing offset relation by rotating said rotary element in the direction for gradually reducing time phase difference with respect to the newly selected desired offset upon change of selection between one desired offset and a different newly desired offset as controlled by said adjustable elements.

43. In a traffic control system having two electrical periodic wave energies of slightly differing frequencies such that one of said energies has a slow progressive phase shift with respect to the other of said periodic wave energies at a rate to provide phase coincidence at predetermined time intervals, a signal controller including means for receiving each of said energies, pulse producing means capable of receiving said energies and of producing an output pulse functionally related to the period of one of said energies and an output pulse functionally related to the period of the other of said energies, coincidence gate circuit means for detecting the times of phase coincidence of said pulses and providing an output in response to said coincidence and means controlled by the output of said coincidence gate circuit means for actuating a traffic signal control circuit.

44. In a traffic control system having two electrical periodic wave energies of slightly differing frequencies such that one of said energies has a slow progressive phase shift with respect to the other of said periodic wave energies at a rate to provide phase coincidence at predetermined time intervals, a signal controller including means for receiving each of said energies, means for producing a brief first output pulse in predetermined time position in relation to the period of one of said wave energies, means for producing a brief second output pulse in predetermined time position in relation to the period of the other of said wave energies, coincidence gate means for receiving said pulses and producing an output in response to coincidence of said first and second pulses, and means controlled by the last named output for controlling a traffic signal circuit.

45. In a master-local control system for operating a plurality of local traffic signal controllers in time cycles having a common total length variable by a master controller with individual adjustment of distribution of the time cycle over a sequence of signal indications and individual adjustment of offset of such cycle of signal indications at the respective local controllers, means at the master controller for generating two electrical periodic wave energies, one of which is shifting slowly and progressively in phase with respect to the other at an adjustable time rate to provide phase coincidence at adjustable predetermined time intervals of the order of the common total traffic signal time cycle, means for transmitting said two wave energies in common to said local controllers, each local controller including means for receiving said transmitted wave energies and for deriving from the respective transmitted wave energies local periodic wave energies of the same periods as the respective transmitted wave energies and in desired phase relation thereto, means controlled by said local periodic wave energies for providing an output in response to coincidence of said local wave energies, traffic signal control circuits, and means controlled by the last named output for controlling said signal control circuits.

46. A combination as in claim 45, and in which the last named means includes cyclic switch means having a sequence of positions and controlled at least at one selected position thereof by said output of said coincidence responsive means, and said cyclic switch means including means for controlling said signal control circuits at selected positions of said cyclic switch means.

References Cited in the file of this patent

UNITED STATES PATENTS

| | | |
|---|---|---|
| 1,689,867 | Evans | Oct. 30, 1928 |
| 1,786,815 | Aspinwall | Dec. 30, 1930 |
| 1,989,509 | FitzGerald | Jan. 29, 1935 |
| 2,203,871 | Koch | June 11, 1940 |
| 2,236,374 | Marrison | Mar. 25, 1941 |
| 2,256,482 | Isbister | Sept. 23, 1941 |
| 2,256,487 | Moseley | Sept. 23, 1941 |
| 2,424,585 | Simon et al. | July 29, 1947 |
| 2,476,639 | Thomas | July 19, 1949 |
| 2,595,263 | Ingalls | May 6, 1952 |
| 2,602,853 | Harrison | July 8, 1952 |
| 2,648,832 | Johnson | Aug. 11, 1953 |
| 2,657,375 | Paul | Oct. 27, 1953 |
| 2,665,417 | Alles | Jan. 5, 1954 |
| 2,684,472 | Ouvil | July 20, 1954 |
| 2,702,896 | Alles | Feb. 22, 1955 |
| 2,708,718 | Wiess | May 17, 1955 |
| 2,745,086 | Reid et al. | May 8, 1956 |
| 2,747,146 | McDonald | May 22, 1956 |
| 2,815,485 | Wilska | Dec. 3, 1957 |